US012017380B2

(12) United States Patent
Baader

(10) Patent No.: US 12,017,380 B2
(45) Date of Patent: Jun. 25, 2024

(54) ADJUSTABLE APPARATUS, SYSTEM AND METHOD FOR CONSTRUCTING INSULATED CONCRETE FORMS

(71) Applicant: Benjamin Baader, Onoway (CA)

(72) Inventor: Benjamin Baader, Onoway (CA)

( * ) Notice: Subject to any disclaimer, the term of this patent is extended or adjusted under 35 U.S.C. 154(b) by 540 days.

(21) Appl. No.: 16/747,524

(22) Filed: Jan. 20, 2020

(65) Prior Publication Data

US 2020/0290234 A1 Sep. 17, 2020

Related U.S. Application Data

(60) Provisional application No. 62/794,352, filed on Jan. 18, 2019.

(51) Int. Cl.
*B28B 7/00* (2006.01)
*B28B 7/42* (2006.01)
(Continued)

(52) U.S. Cl.
CPC .............. *B28B 7/0097* (2013.01); *B28B 7/42* (2013.01); *E04B 1/62* (2013.01); *B28B 13/06* (2013.01)

(58) Field of Classification Search
CPC ......... B28B 7/02; B28B 7/023; B28B 7/0038; B28B 7/0097; B28B 7/085; B28B 7/243; B28B 1/44; B28B 1/0935; B28B 3/10; B28B 3/027; B28B 11/042; B29C 39/025; B29C 39/265; B29C 37/001; B29C 70/68; B29C 70/541; B29C 31/085;
(Continued)

(56) References Cited

U.S. PATENT DOCUMENTS 775,685 A 11/1904 Shute
839,819 A 1/1907 DeLhorbe
(Continued)

FOREIGN PATENT DOCUMENTS

AU 3522778 10/1979
CA 2264099 2/1998
(Continued)

OTHER PUBLICATIONS

Machine English translation of Komine et al. (JP-2001145909-A) (Year: 2001).*
(Continued)

*Primary Examiner* — Jeffrey M Wollschlager
*Assistant Examiner* — Edgaredmanuel Troche
(74) *Attorney, Agent, or Firm* — Robert A. Nissen

(57) ABSTRACT

Systems and methods are described for constructing insulated concrete forms and their skeletons, A mold assembly is discussed for molding insulated concrete forms and has an outer housing; first and second mold lids; first and second entrance doors; first and second pluralities of downward oriented extensions, each of the first and second pluralities of downward oriented extensions being movable between a retracted position and an inserted position, to define first and second mold cavities; and fill guns oriented for injecting insulating polymeric material into the first and second mold cavities. The systems and methods may mold insulated panels on both sides of an insulated concrete form skeleton, and may be used to make forms of any length.

18 Claims, 26 Drawing Sheets

(51) Int. Cl.
*B28B 13/06* (2006.01)
*E04B 1/62* (2006.01)

(58) Field of Classification Search
CPC ... B29C 53/822; B29C 33/0016; B29C 33/12; B29C 33/485; E04B 2/8617
USPC .............. 425/441, 115; 249/63, 66.1, 81, 83
See application file for complete search history.

(56) References Cited

U.S. PATENT DOCUMENTS

| | | | | |
|---|---|---|---|---|
| 929,470 | A | | 7/1909 | Neil |
| 958,419 | A | | 5/1910 | Mowat |
| 1,482,434 | A | | 2/1924 | Hotchkiss |
| 1,588,229 | A | | 6/1926 | Hotchkiss |
| 1,743,136 | A | | 1/1930 | Harrold |
| 1,852,049 | A | | 4/1932 | Graef |
| 1,991,256 | A | | 2/1935 | Muntz |
| 2,365,563 | A | | 12/1944 | Krueper |
| 2,739,364 | A | | 3/1956 | Clemans |
| 2,781,657 | A | | 2/1957 | Taylor |
| 2,898,659 | A | | 8/1959 | Shoemaker |
| 3,103,046 | A | | 9/1963 | La Bate |
| 3,211,413 | A | | 10/1965 | Low, III |
| 3,236,490 | A | | 2/1966 | Lovgren |
| 3,751,867 | A | | 8/1973 | Layne |
| 3,767,158 | A | | 10/1973 | Mikus |
| 3,788,020 | A | | 1/1974 | Gregori |
| 3,985,329 | A | | 10/1976 | Liedgens |
| 3,995,825 | A | | 12/1976 | Ward |
| 4,516,372 | A | | 5/1985 | Grutsch |
| 4,604,843 | A | | 8/1986 | Ott |
| 4,634,359 | A | * | 1/1987 | Sartorio ................ E04B 2/8617 249/161 |
| 4,669,234 | A | | 6/1987 | Wilnau |
| 4,698,947 | A | | 10/1987 | McKay |
| 4,706,429 | A | | 11/1987 | Young |
| 4,750,308 | A | | 6/1988 | McKay |
| 4,765,109 | A | | 8/1988 | Boeshart |
| 4,884,382 | A | | 12/1989 | Horobin |
| 4,889,310 | A | | 12/1989 | Boeshart |
| 4,936,540 | A | | 6/1990 | Boeshart |
| 4,938,449 | A | | 7/1990 | Boeshart |
| 4,967,528 | A | | 11/1990 | Doran |
| 4,972,646 | A | | 11/1990 | Miller |
| 5,072,569 | A | | 12/1991 | VanTassel |
| 5,074,088 | A | | 12/1991 | Bergeron |
| 1,421,956 | A | | 7/1992 | Kestler |
| 5,169,585 | A | | 12/1992 | Le Gourrierec |
| 5,323,578 | A | | 6/1994 | Chagnon |
| 5,431,368 | A | | 7/1995 | Wilde |
| 5,459,971 | A | | 10/1995 | Sparkman |
| 5,465,542 | A | | 11/1995 | Terry |
| 5,497,592 | A | | 3/1996 | Boeshart |
| 5,657,600 | A | | 8/1997 | Mensen |
| 5,699,640 | A | | 12/1997 | Bourgeois |
| 5,729,942 | A | | 3/1998 | Moore, Jr. |
| 5,735,093 | A | | 4/1998 | Grutsch |
| 5,761,874 | A | | 6/1998 | Hayakawa |
| 5,809,725 | A | | 9/1998 | Cretti |
| 5,861,105 | A | | 1/1999 | Martineau |
| 5,890,337 | A | | 4/1999 | Boeshart |
| 5,992,114 | A | | 11/1999 | Zelinsky |
| 6,079,176 | A | | 6/2000 | Westra |
| 6,119,432 | A | | 9/2000 | Niemann |
| 6,178,711 | B1 | | 1/2001 | Laird |
| 6,230,462 | B1 | | 5/2001 | Béliveau |
| 6,240,693 | B1 | | 6/2001 | Komasara |
| 6,256,962 | B1 | | 7/2001 | Boeshart |
| 6,293,067 | B1 | | 9/2001 | Meendering |
| 6,314,694 | B1 | | 11/2001 | Cooper |
| 6,318,040 | B1 | | 11/2001 | Moore |
| 6,336,301 | B1 | | 1/2002 | Moore |
| 6,389,758 | B1 | | 5/2002 | Martin, Jr. |
| 6,571,523 | B2 | | 6/2003 | Chambers |
| 6,647,686 | B2 | | 11/2003 | Dunn |
| 6,665,992 | B2 | | 12/2003 | Hew |
| 6,832,456 | B1 | | 12/2004 | Bilowol |
| 6,945,506 | B2 | | 9/2005 | Long, Sr. |
| 6,948,289 | B2 | | 9/2005 | Bravinski |
| 6,978,581 | B1 | | 12/2005 | Spakousky |
| 8,468,761 | B2 | | 6/2013 | Marshall |
| 8,555,584 | B2 | | 10/2013 | Ciuperca |
| 8,616,520 | B2 | | 12/2013 | Baader |
| 8,646,236 | B2 | | 2/2014 | Hilliard |
| 10,006,200 | B2 | | 6/2018 | Baader |
| 2001/0000844 | A1 | | 5/2001 | Kubica |
| 2001/0027631 | A1 | | 10/2001 | Moore |
| 2002/0092253 | A1 | | 7/2002 | Beliveau |
| 2003/0033782 | A1 | | 2/2003 | Schmidt |
| 2003/0192272 | A1 | | 10/2003 | Bravinski |
| 2004/0079860 | A1 | | 4/2004 | Ward |
| 2004/0129857 | A1 | | 7/2004 | Musk |
| 2004/0237438 | A1 | | 12/2004 | Keith |
| 2005/0028467 | A1 | | 2/2005 | Bentley |
| 2005/0108985 | A1 | | 5/2005 | Bravinski |
| 2006/0010831 | A1 | | 1/2006 | Skakie |
| 2006/0117690 | A1 | | 6/2006 | Garrett |
| 2006/0124825 | A1 | | 6/2006 | Amend |
| 2006/0248832 | A1 | | 11/2006 | Shidler |
| 2006/0277855 | A1 | | 12/2006 | Westra |
| 2007/0094973 | A1 | | 5/2007 | Zhu |
| 2007/0094974 | A1 | | 5/2007 | Velickovic |
| 2008/0005991 | A1 | | 1/2008 | Meilleur |
| 2008/0028709 | A1 | | 2/2008 | Pontarolo |
| 2008/0083867 | A1 | | 4/2008 | Myers |
| 2008/0277560 | A1 | | 11/2008 | Simonsen |
| 2009/0013629 | A1 | | 1/2009 | Boeshart |
| 2009/0057530 | A1 | | 3/2009 | Sheckter |
| 2009/0173870 | A1 | | 7/2009 | Long, Sr. |
| 2009/0218474 | A1 | | 9/2009 | Bowman |
| 2011/0057090 | A1 | | 5/2011 | Spude |
| 2011/0239566 | A1 | | 10/2011 | Ciuperca |
| 2011/0268924 | A1 | * | 11/2011 | Dickens .................. B29C 43/04 428/156 |
| 2012/0139163 | A1 | * | 6/2012 | Garfinkel .................. B28B 7/22 425/258 |
| 2013/0074432 | A1 | | 3/2013 | Ciuperca |
| 2013/0180192 | A1 | | 7/2013 | Crosby |
| 2013/0263544 | A1 | | 10/2013 | Pfeiffer |
| 2013/0312350 | A1 | | 11/2013 | Kreizinger |
| 2013/0326980 | A1 | | 12/2013 | Hilliard, Sr. |
| 2015/0167295 | A1 | | 6/2015 | Baader |
| 2015/0290835 | A1 | * | 10/2015 | Garfinkel .............. B28B 7/0044 425/441 |
| 2019/0093355 | A1 | | 3/2019 | Baader |
| 2020/0290234 | A1 | | 9/2020 | Baader |

FOREIGN PATENT DOCUMENTS

| | | | | | |
|---|---|---|---|---|---|
| CA | 2298435 | | | 9/1998 | |
| CA | 2597832 | | | 2/2009 | |
| CA | 2925625 | A1 | | 6/2015 | |
| CA | 3069028 | A1 | | 7/2021 | |
| CA | 3197462 | A1 | | 4/2022 | |
| CH | 639893 | | | 12/1983 | |
| DE | 9416041 | | | 11/1994 | |
| EP | 0188374 | | | 10/1988 | |
| EP | 0764745 | | | 3/1997 | |
| EP | 3084095 | A1 | | 10/2016 | |
| EP | 4093587 | A1 | | 11/2022 | |
| FR | 2552472 | | | 11/1985 | |
| GB | 1604687 | | | 12/1981 | |
| JP | 2001145909 | A | * | 5/2001 | ....... C04B 35/62695 |
| WO | 94023145 | | | 10/1994 | |
| WO | 95023899 | | | 3/1995 | |
| WO | 9516835 | | | 6/1995 | |
| WO | 1996015335 | | | 5/1996 | |
| WO | WO-9911442 | A1 | * | 3/1999 | ............ B28B 1/008 |
| WO | 2015089642 | | | 6/2015 | |

(56) References Cited

FOREIGN PATENT DOCUMENTS

| | | | |
|---|---|---|---|
| WO | 2021/146808 | A1 | 7/2021 |
| WO | 2022/067441 | A1 | 4/2022 |

OTHER PUBLICATIONS

European Patent Office, Supplementary European Search Report, EP3084095 File Wrapper, 9 pages.
International Search Report Corresponding to PCT/CA2014/000904 dated Mar. 11, 2015, 3 pages.
Written Opinion Corresponding to PCT/CA2014/000904 dated Mar. 11, 2015, 5 pages.
European Search Report Corresponding to PCT/CA2014000904 dated Apr. 24, 2017, 9 pages.
European Patent Office, Epo Form 2906, dated Jan. 15, 2020, 2 pages.
Written Opinion Corresponding to PCT/CA2021050064, dated Apr. 26, 2021, 4 pages.
International Search Report Corresponding to PCT/CA2021050064, dated Jan. 21, 2021, 5 pages.

* cited by examiner

ADJUSTABLE APPARATUS, SYSTEM AND METHOD FOR CONSTRUCTING INSULATED CONCRETE FORMS

TECHNICAL FIELD

The present application relates generally to an apparatus, system and method for constructing an insulated concrete form. More particularly, it relates to a system and method for constructing monolithic insulated concrete forms.

BACKGROUND DESCRIPTION

This section provides background information to facilitate a better understanding of the various aspects of the present technology. It should be understood that the statements in this section of this document are to be read in this light, and not as admissions of prior art.

Insulated concrete forms or insulating concrete forms is a modular system for reinforced concrete that stays in place as permanent interior and exterior walls, floors and roofs. Insulated concrete form units are connected together as needed and filled with concrete. Insulated concrete forms have an interior skeleton assembly and exterior molded walls. The exterior molded walls are generally made of polystyrene foam, polyurethane foam, cement-bonded wood fiber, cement-bonded polystyrene beads, cellular concrete or thermos-acoustic-styro-concrete 20 (THASTRYON) being a mixture of cement, water and recycled expanded polystyrene.

Insulated concrete form walls are constructed one row at a time with modular units being placed in end to end relation with each other for the length of the wall. Interior and exterior finishes such as siding and drywall can be affixed directly to the exterior molded walls of the insulated concrete forms.

BRIEF SUMMARY OF THE PRESENT TECHNOLOGY

An assembly machine for constructing insulated concrete form skeletons is disclosed, comprising: a strap loading assembly having a first side and a second side, the first side and the second side being positioned in opposite and parallel spaced relation to each other, each of the first side and the second side having a support structure and a feeder having a loading end and a press assembly feeding end, the press assembly feeding end of the strap loading assembly being structured to position in use a strap in a strap guide, the strap being movable along the strap guide into a press assembly; a ladder loading assembly having a support structure and a ladder guide, the ladder guide having a loading end and a press assembly feeding end, the ladder guide being structured to move and position in use a strap receiving ladder into the press assembly; and the press assembly having a support structure, a first side and a second adjustable side with a space between the first side and the second adjustable side of the press assembly defining a press cavity, each of the first side and the second adjustable side of the press assembly having a press assembly strap guide, the press assembly strap guides being continuous with the strap guides of the strap loading assembly to move in use the straps through the press assembly strap guides, the press assembly structured to align in use the straps and the strap receiving ladder for connection, the second adjustable side being movable to press in use the straps and strap receiving ladder into connection with each other to form an insulated concrete form skeleton, and an exit through which the completed insulated concrete form skeleton is removable.

A mold assembly for molding insulated concrete forms is disclosed, comprising: an outer housing having a bottom support base, a first side wall and a second side wall defining an interior cavity, the outer housing having an entrance and an exit for access to the interior cavity; first and second mold lids; first and second entrance doors; first and second pluralities of downward oriented extensions, each of the first and second pluralities downward oriented extensions being movable between a retracted position and an inserted position, in which, when the first and second pluralities of downward oriented extensions are in the inserted position, with the first and second pluralities of downward oriented extensions inserted into a series of spaces defined by and along opposed sides of an insulated concrete form skeleton that is located within the interior cavity in use, first and second mold cavities are defined by the first and second mold lids, the first and second entrance doors, the first and second pluralities of downward oriented extensions, and the insulated concrete form skeleton; fill guns oriented for injecting insulating polymeric material into the first and second mold cavities; and a blocking part used to seal the exit of the mold assembly during molding of a first insulated concrete form.

A method of constructing monolithic insulated concrete forms is disclosed, comprising the steps of:

loading a strap having at least one ladder connector into a press assembly, the press assembly having a first side and a second adjustable side with the space between the first side and the second adjustable side defining a press cavity, each of the first side and the second adjustable side having a strap guide into which the strap is loaded; loading at least one strap receiving ladder having a strap connector into the press cavity of the press assembly, the strap receiving ladder being positioned such that the strap connector of the strap receiving ladder and the ladder receiver connector of the strap are aligned; moving the second adjustable side of the press assembly relative to the first side to press the strap and the strap receiving ladder into connection to form an insulated concrete form skeleton; moving the insulated concrete form skeleton from the press assembly into a mold; molding insulated panels to the insulated concrete form skeleton to form an insulated concrete form; connecting a second insulated concrete form skeleton to the first insulated concrete form; and moving the second insulated concrete form skeleton into the mold and molding insulated panels to the second insulated concrete form skeleton to lengthen the insulated concrete form.

An assembly machine is disclosed for constructing insulated concrete form skeletons that has a strap loading assembly, a loader loading assembly and a press assembly. The strap loading assembly has a first side and a second side. The first side and the second side are positioned in opposite and parallel spaced relation to each other. Each of the first side and the second side having a support structure and at least one feeder. The feeder has a loading end and a press feeding end. The press feeding end positions a strap in a guide channel The strap is movable along the guide channel towards a press assembly. The ladder loading assembly has a support structure and at least one loading channel The loading channel has a loading end and a press feeding end. A strap receiving ladder is movable along the loading channel and through the press feeding end of the loading channel and into the press assembly. The press assembly has a support structure, a first side and a second side with the space between the first side and the second side defining a press cavity. Each of the first side and the second side has at least one guide channel that is continuous with the at least one guide channel of the strap loading assembly. The at least one strap is movable from the at least one guide channel of the strap loading assembly through the at least one guide channel of the press assembly. The at least one guide channel of the press assembly has a stop for positioning the at least one strap within the at least one guide channel such that the at least one strap and the at least one strap receiving ladder are aligned for connection. At least one of the first side and the second side are movable to press the at least one strap and the at least one strap receiving ladder into connection with each other. An exit is provided through which the completed insulated concrete form skeleton is removable. In another embodiment, the straps are movable along the guide channels of the strap loading assembly by a ram. Ram may have a vertical pushing arm for contacting all of the straps within the guide channels on the first side or second side of the strap loading assembly. In another embodiment, the guide channels of the press assembly have rollers for moving the straps along the guide channels. While the rollers may be driven by any means known in the art, in one embodiment the rollers are driven by an electric motor. In another embodiment, assembly machine has an automated means of loading straps into the loading end of the feeders of the strap loading assembly. Assembly machine may have automated means of loading strap receiving ladders into the loading end of the loading channels of the ladder loading assembly. In another embodiment, at least one of the first side of the press assembly and the second side of the press assembly is movable by pneumatic pistons. In another embodiment, the first side of the press assembly remains stationary and the second side of the press assembly is movable for pressing the straps and strap receiving ladders into connection with each other.

A mold assembly is disclosed for molding insulated concrete forms. The mold assembly has an outer housing with a base, a first side wall and a second adjustable side wall that define an interior cavity. The outer housing has an entrance and an exit for access to the interior cavity. Two independent lids are sized to seal the interior cavity of the outer housing. The lids are movable between an open position in which access to the interior cavity is provided through the entrance of the outer housing and a closed position in which access to the interior cavity is limited. The mold assembly has a sealing door that seals the entrance of the outer housing in the closed position. The lids have a plurality of downward oriented extensions that are reinforced with removable spacers. The downward oriented extensions are positioned such that they allow for the creation of form voids in the molded insulated concrete forms. At least one fill gun is provided for injecting foam beads into the interior cavity. A steam inlet is also provided for injecting steam into the interior cavity. Another steam inlet/drain is provided on the bottom side of the mold assembly. Rubber block plugs will be used to close and seal off the mold assembly while making the first insulated concrete form. After that, the rubber block plugs are removed and the finished insulated concrete form will seal off the exit. The insulated concrete form will be ejected and labelled with ejection rollers placed near the exit of the mold machine. In one embodiment, a plurality of fill guns is provided and spaced on the lid for injection of foam beads into the interior cavity of the mold. In another embodiment, the downward oriented extensions of the mold assembly have removable spacer plates to reduce buckling as well as adjust the size of the interior cavity of the insulated concrete form.

A system for the construction of monolithic insulated concrete forms is disclosed. The system has an assembly machine that is used for assembling straps and strap receiving ladders into insulated concrete form skeletons and a mold assembly which molds the insulated concrete form skeletons into insulated concrete forms. The assembly machine has a strap loading assembly, a loader loading assembly and a press assembly. The strap loading assembly has a first side and a second side. The first side and the second side are positioned in opposite and parallel spaced relation to each other. Each of the first side and the second side having a support structure and at least one feeder. The feeder has a loading end and a press feeding end. The press feeding end positions a strap in a guide channel The strap is movable along the guide channel towards a press assembly. The ladder loading assembly has a support structure and at least one loading channel The loading channel has a loading end and a press feeding end. A strap receiving ladder is movable along the loading channel and through the press feeding end of the loading channel and into the press assembly. The press assembly has a support structure, a first side and a second side with the space between the first side and the second side defining a press cavity. Each of the first side and the second side has at least one guide channel that is continuous with the at least one guide channel of the strap loading assembly. The at least one strap is movable from the at least one guide channel of the strap loading assembly through the at least one guide channel of the press assembly. The at least one guide channel of the press assembly has a stop for positioning the at least one strap within the at least one guide channel such that the at least one strap and the at least one strap receiving ladder are aligned for connection. At least one of the first side and the second side are movable to press the at least one strap and the at least one strap receiving ladder into connection with each other. An exit is provided through which the completed insulated concrete form skeleton is removable. The mold assembly has an outer housing with a base, a first side wall and a second adjustable side wall that define an interior cavity. The outer housing has an entrance and an exit for access to the interior cavity. Two independent lids are sized to seal the interior cavity of the outer housing. The lids are movable between an open position in which access to the interior cavity is provided through the entrance of the outer housing and a closed position in which access to the interior cavity is limited. The mold assembly has a sealing door that seals the entrance of the outer housing in the closed position. The lids have a plurality of downward oriented extensions that are reinforced with removable spacers. The downward oriented extensions are positioned such that they allow for the creation of form voids in the molded insulated concrete forms. At least one fill gun is provided for injecting foam beads into the interior cavity. A steam inlet is also provided for injecting steam into the interior cavity. Another steam inlet/drain is provided on the bottom side of the mold assembly. Rubber block plugs will be used to close and seal off the mold assembly while making the first insulated concrete form. After that, the rubber block plugs are removed, and the finished insulated concrete form will seal off the exit. The insulated concrete form will be ejected and labelled with ejection rollers placed near the exit of the mold machine. In one embodiment, each of the first side and the second side of the press loading assembly has at least two feeders positioned parallel to one another and spaced vertically from each other. It is preferable that the number of guide channels in the press assembly is the same as the number of guide channels in the strap loading assembly. In another embodiment, the ladder loading assembly has at least two loading channels positioned parallel to one another and spaced horizontally from each other. In another embodiment, the first side and the second side of the strap loading assembly are substantially the same. In another embodiment, the straps are movable along the guide channels of the strap loading assembly by a ram. Ram may have a vertical pushing arm for contacting all of the straps within the guide channels on the first side or second side of the strap loading assembly. In another embodiment, the guide channels of the press assembly have rollers for moving the straps along the guide channels. While the rollers may be driven by any means known in the art, in one embodiment the rollers are driven by an electric motor. In another embodiment, assembly machine has an automated means of loading straps into the loading end of the feeders of the strap loading assembly. Assembly machine may have automated means of loading strap receiving ladders into the loading end of the loading channels of the ladder loading assembly. In another embodiment, at least one of the first side of the press assembly and the second side of the press assembly is movable by pneumatic pistons. In another embodiment, the first side of the press assembly remains stationary and the second side of the press assembly is movable for pressing the straps and strap receiving ladders into connection with each other. In one embodiment, a plurality of fill guns is provided and spaced on the lid for injection of foam beads into the interior cavity of the mold. In another embodiment, the downward oriented extensions of the mold assembly have removable spacer plates to reduce buckling as well as adjust the size of the interior cavity of the insulated concrete form. In one embodiment, the system for constructing a monolithic concrete form also has an adjustable staging area. The staging area has a base, a first wall and a second wall which define a staging channel The support structure has an entrance end and an exit end for access to the staging channel The entrance end of the staging area is positioned adjacent to the press assembly for accepting the insulated concrete form skeleton from the press assembly. The exit end is positioned adjacent to the entrance of the mold assembly for guiding the insulated concrete form skeleton into the mold assembly. The staging area can be disconnected and reassembled to adjust for different sizes of insulated concrete form skeleton. In one embodiment, the staging area has driving means for moving the insulated concrete form skeleton through the staging area. The driving means may be rollers that are positioned adjacent to the exit end of the staging area with the rollers being driven by a motor.

A method of constructing a monolithic insulated concrete form is disclosed. At least one strap with at least one ladder receiver connector is loaded into a press assembly. The press assembly has a first side and a second side with the space between the first side and the second side defining a press cavity. Each of the first side and the second side has at least one guide channel into which the at least one strap is loaded. At least one strap receiving ladder with at least one strap connector is loaded into the press cavity of the press assembly. The at least one strap connector of the at least one strap receiving ladder and the at least one ladder receiver connector of the at least one strap are aligned. At least one of the first side and the second side of the press assembly is moved to press the at least one strap and the at least one strap receiving ladder into connection to form an insulated concrete form skeleton. The insulated concrete form skeleton is moved from the press assembly into a mold where the insulated concrete form is molded. A second insulated concrete form skeleton is created and connected to the first insulated concrete form. The second insulated concrete for skeleton is moved into the mold and the second insulated concrete form is molded such that a continuous molded insulated concrete form is created. In one embodiment, at least two straps are positioned parallel to one another and spaced vertically from each other in the press assembly. In another embodiment, at least two strap receiving ladders are positioned parallel to one another spaced vertically from each other in the press assembly. In one embodiment, each of the first side and the second side of the press loading assembly has at least two feeders positioned parallel to one another and spaced vertically from each other. It is preferable that the number of guide channels in the press assembly is the same as the number of guide channels in the strap loading assembly. In another embodiment, the ladder loading assembly has at least two loading channels positioned parallel to one another and spaced horizontally from each other. In another embodiment, the first side and the second side of the strap loading assembly are substantially the same.

In various embodiments, there may be included any one or more of the following features: Each of the first side and the second side of the strap loading assembly there are at least two feeders positioned parallel to one another and spaced vertically from each other. The number of strap guides in the press assembly is the same as the number of strap guides in the strap loading assembly. There are at least two ladder guides positioned parallel to one another and spaced horizontally from each other. The first side and the second side of the strap loading assembly are substantially the same. The straps are movable in use along the strap guides of the strap loading assembly by an actuator. The actuator comprises a ram that has a vertical pushing arm for contacting all of the straps in use within the strap guides on first side or second side of the strap loading assembly. The strap guides of the press assembly have rollers for moving the straps. The rollers are driven by electric motors. Automated means of loading straps into the loading end of the feeders of the strap loading assembly. Automated means of loading strap receiving ladders into the loading end of the ladder guides of the ladder loading assembly. At least one of the first side of the press assembly and the second side of the press assembly are movable by pneumatic pistons. The first side of the press assembly and the second side of the press assembly are movable to press in use the straps and strap receiving ladder into connection with each other. Wherein in use the first side of the press assembly remains stationary and the second side of the press assembly is movable for pressing the at straps and the strap receiving ladder into connection with each other. One or both of the strap guides and press assembly strap guides comprise guide channels. The press assembly guides have a stop for positioning the straps within the press assembly guides such that the straps and the strap receiving ladder are aligned for connection. Ejection rollers for ejecting the insulated concrete form skeleton. The fill guns comprise pluralities of fill guns spaced on the first and second mold lids. Wherein the first and second pluralities of downward oriented extensions have removable spacer plates to reduce buckling as well as adjust the interior size of the first and second mold cavities. The first and second pluralities of downward oriented extensions are mounted on the first and second mold lids, respectively. The first and second pluralities of downward oriented extensions are structured to translate vertically between the retracted and inserted positions. Ejection rollers at the exit.

The blocking part comprises a rubber block plug. The fill guns comprise foam guns for filling foam beads in the first and second mold cavities; and further comprising: a steam inlet for injecting steam into the first and second mold cavities; and a cold air inlet for cooling down the molded insulated concrete form using sensor-aided thermoelectric coolers and aluminum fins. An adjustable spacer between the first and second pluralities of downward oriented extensions for adjusting the first and second mold cavities in size. A staging area having a support structure, the support structure having a base, a first wall and a second wall defining an adjustable staging guide, the support structure having an entrance end and an exit end for access to the staging guide, the entrance end of the staging area being positioned adjacent to the press assembly for accepting the insulated concrete form skeleton from the press assembly, the exit end being positioned adjacent to the entrance of the mold assembly for guiding the insulated concrete form skeleton into the mold assembly. The staging area further comprises a form drive for moving the insulated concrete form skeleton through the staging area. The form drive comprises rollers positioned adjacent the exit end of the staging area, the rollers being driven by motors. There are at least two straps positioned parallel to one another and spaced vertically from each other in the press assembly and the insulated concrete form skeleton. There are at least two strap receiving ladders positioned parallel to one another in the press assembly and insulated concrete form skeleton and spaced horizontally from each other. Ejection rollers eject the insulated concrete form.

There has thus been outlined, rather broadly, features of the present technology in order that the detailed description thereof that follows may be better understood and in order that the present contribution to the art may be better appreciated. Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings. As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology. The foregoing summary is not intended to summarize each potential embodiment or every aspect of the subject matter of the present disclosure. These and other aspects of the device and method are set out in the claims. These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the present technology to the particular embodiments shown.

DETAILED DESCRIPTION OF THE PREFERRED EMBODIMENTS

Figure 1:
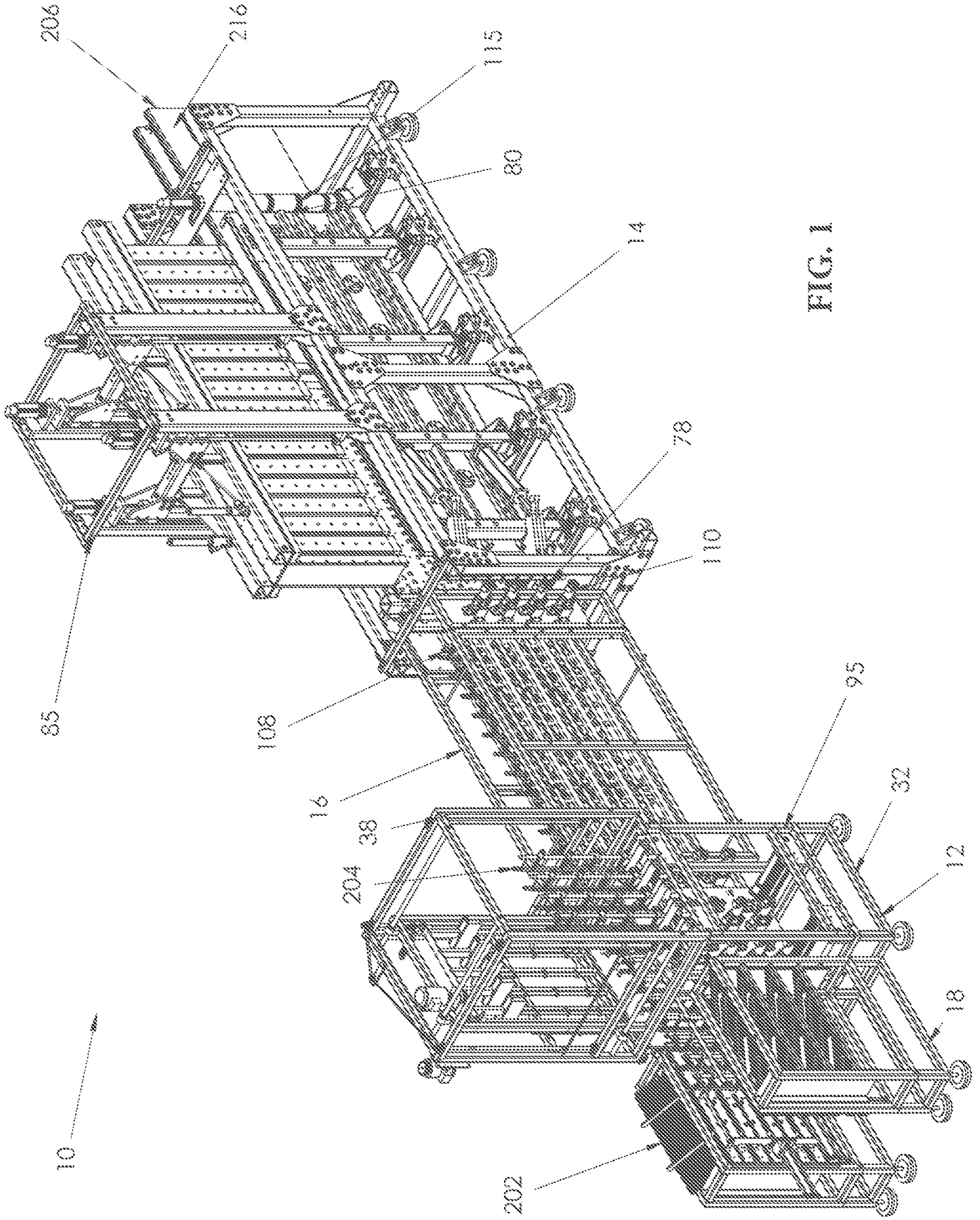
FIG. 1 is a perspective view of a system for constructing monolithic insulated concrete forms.

A system for constructing monolithic insulated concrete forms, generally identified by reference numeral 10, will now be described with reference to FIG. 1 through FIG. 30.

Referring to FIG. 1, a system for constructing monolithic insulated concrete forms 10 may have an assembly machine 12 where straps 202 and strap receiving ladders 204 (ladder receivers) are connected together to form insulated concrete form skeletons 200. A mold assembly 14 may be present in which a foam material 206 is molded onto the insulated concrete form skeletons 200. A staging area 16 between assembly machine 12 and mold assembly 14 may be provided for guiding insulated concrete form skeletons 200 from assembly machine 12 to mold assembly 14 and connecting insulated concrete form skeletons together. The mold assembly 14 may be supported by the main framing 11.

Figure 2:
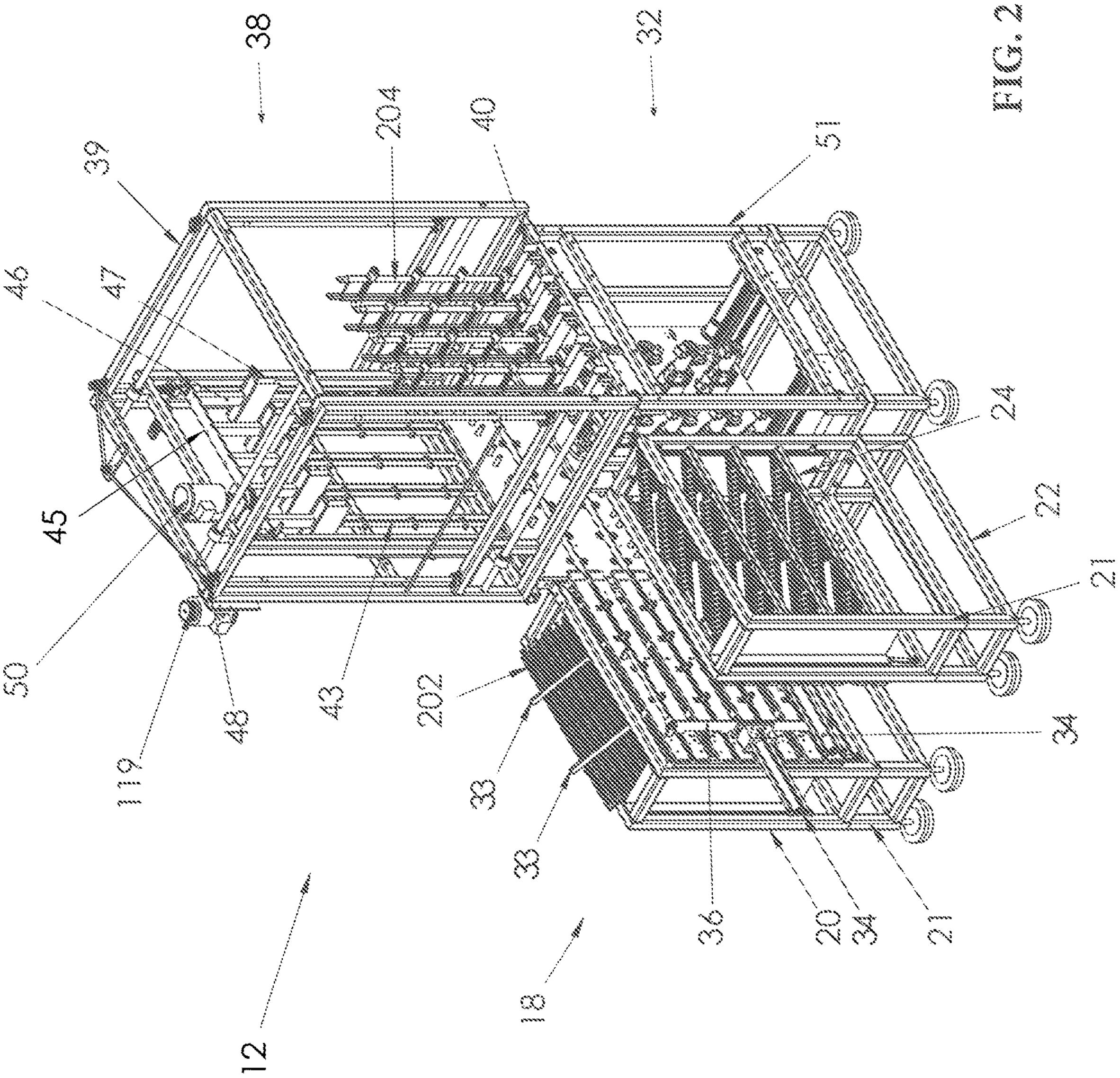
FIG. 2 is a front perspective view of an apparatus for constructing a skeleton of an insulated concrete form.
Figure 24:
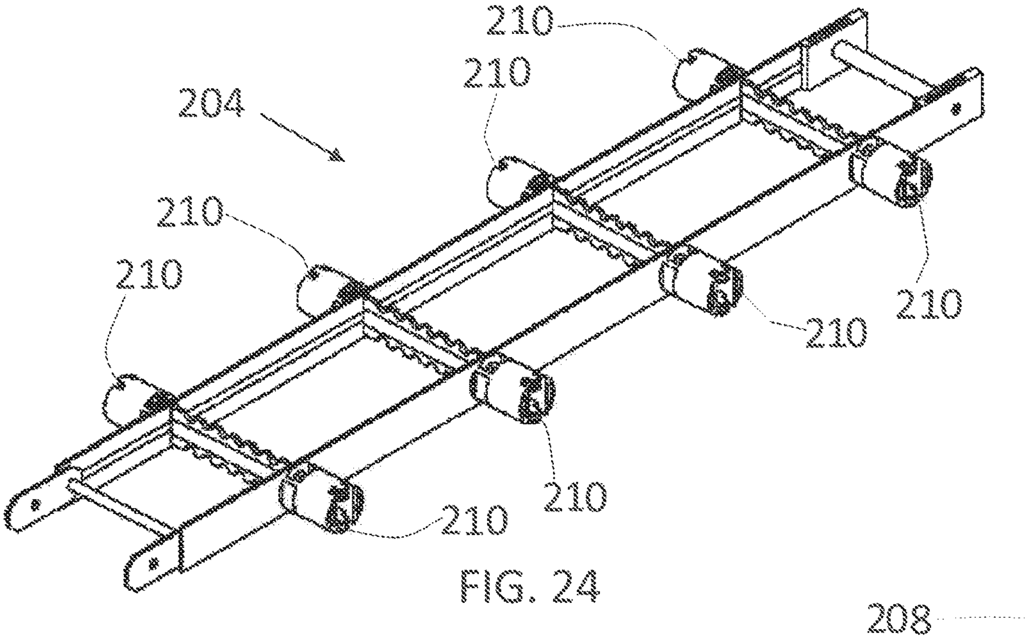
FIG. 24 is a perspective view of a strap receiving ladder.
Figure 25:
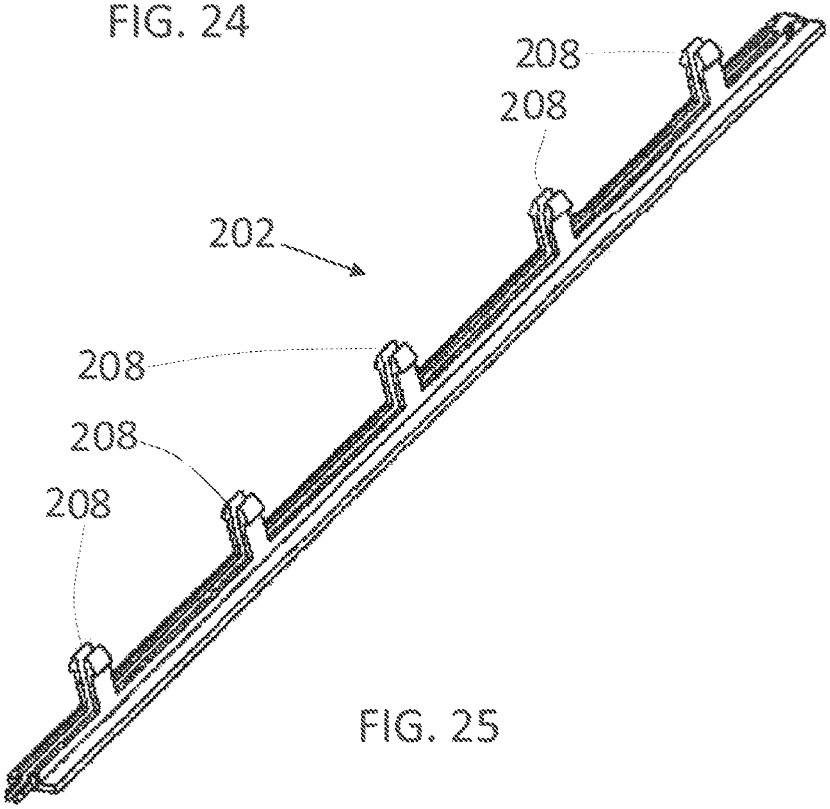
FIG. 25 is a perspective view of a receiver.
Figure 26:
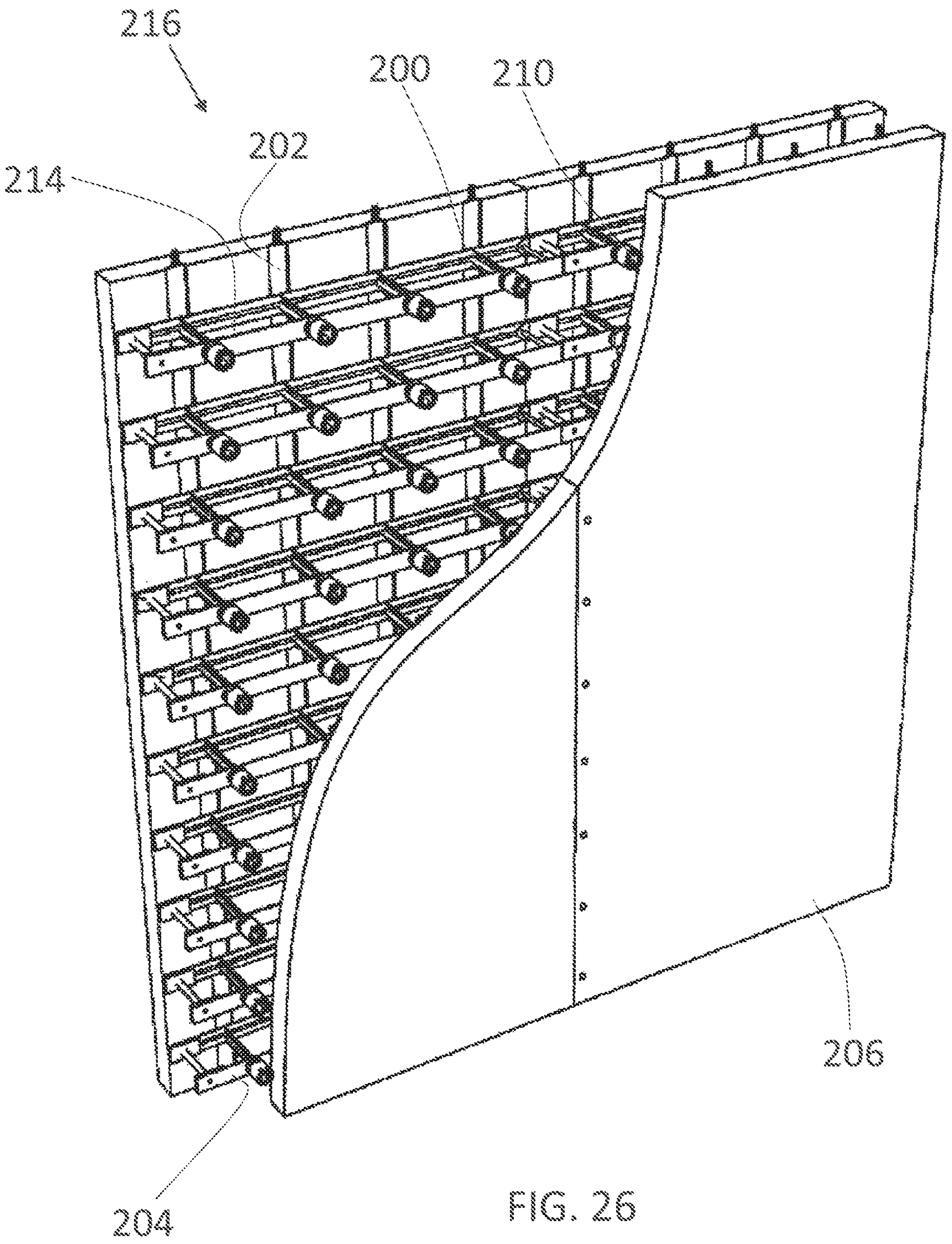
FIG. 26 is a perspective view, partially in section, of an insulated concrete form.

Referring to FIG. 2, assembly machine 12 may be used to connect straps 202 and strap receiving ladders 204 together to form insulated concrete form skeletons 200. The number of straps 202 and strap receiving ladders 204 that may be used to make the insulated concrete form skeletons 200 may vary depending upon the size of the insulated concrete form skeleton 200 to be made. At least one strap 202 and at least one strap receiving ladder 204 may be used in the creation of the insulated concrete form skeleton 200. A person of skill will understand that the number of straps 202 and strap receiving ladders 204 used may vary. Referring to FIG. 26, in the embodiment shown, the skeletons 200 may be formed using a plurality of straps 202 positioned parallel to one another and vertically spaced from one another in conjunction with a plurality of strap receiving ladders 204 that may be positioned parallel to one another and horizontally space from one another. Referring to FIG. 25, the straps 202 may each have a plurality of male connectors 208. Referring to FIG. 24, the strap receiving ladders 204 may each have a plurality of female connectors 210 positioned along the length of each side of the strap receiving ladders 204. Referring to FIG. 26, the male connectors 208, shown in FIG. 25, of the straps 202 and the female connectors 210 of the strap receiving ladders 204 connect together when pressure is applied. The connections between the male connectors 208 and the female connectors 210 are strongest when the connection is irreversible. A person of skill will understand that different types of connections between the straps 202 and the strap receiving ladders 204 may be used.

Figure 3:
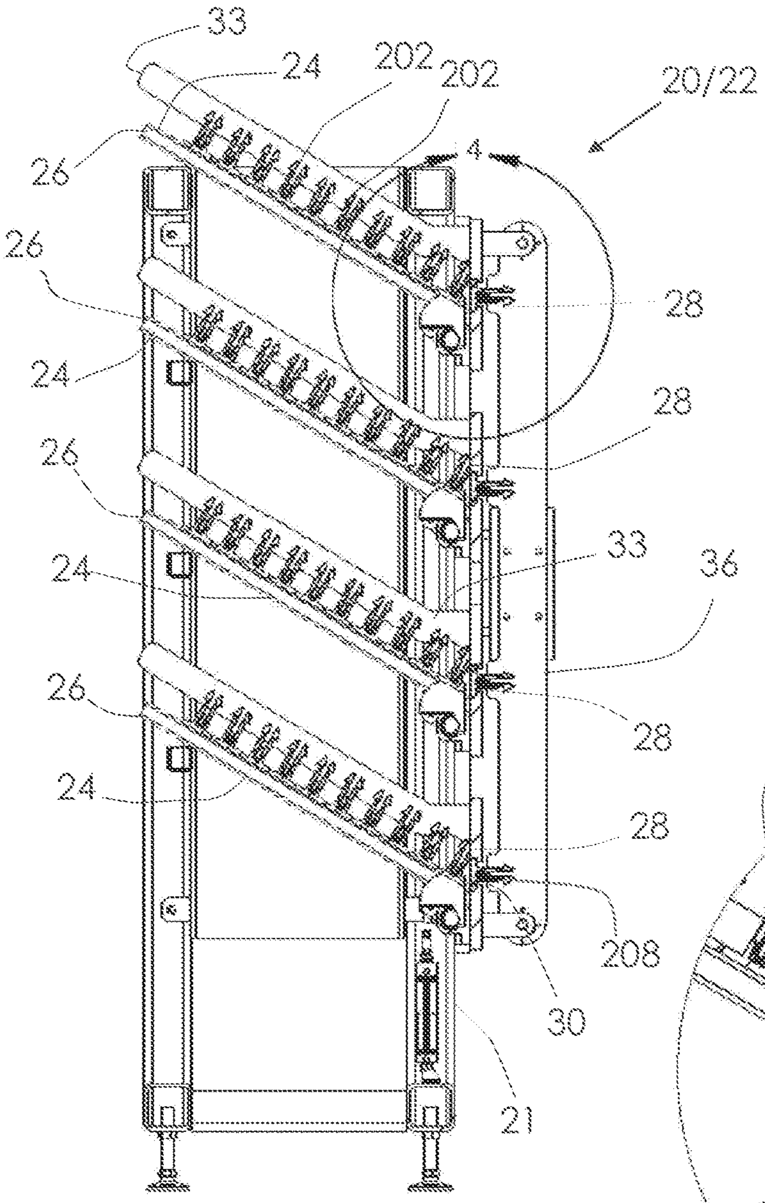
FIG. 3 is an end elevation view of one side of a strap loading assembly.
Figure 4:
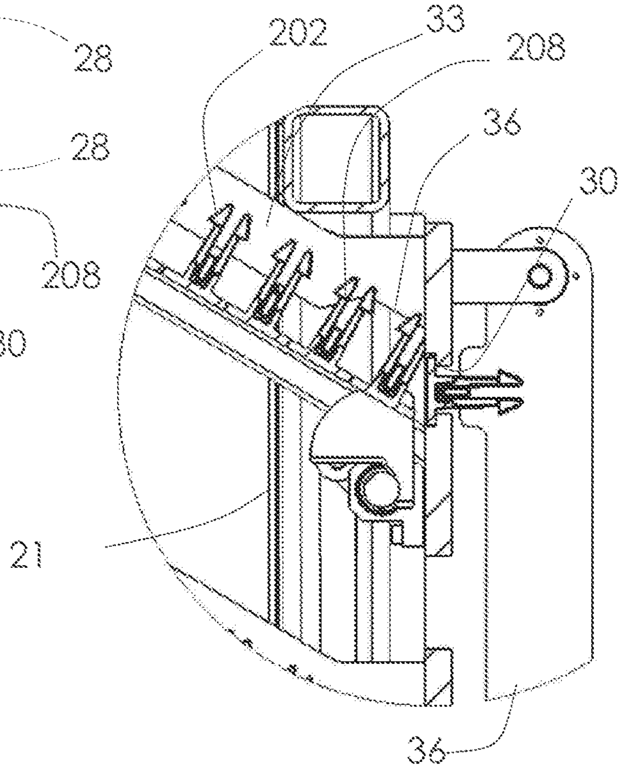
FIG. 4 is a detailed view of a portion of the strap loading assembly.
Figure 5:
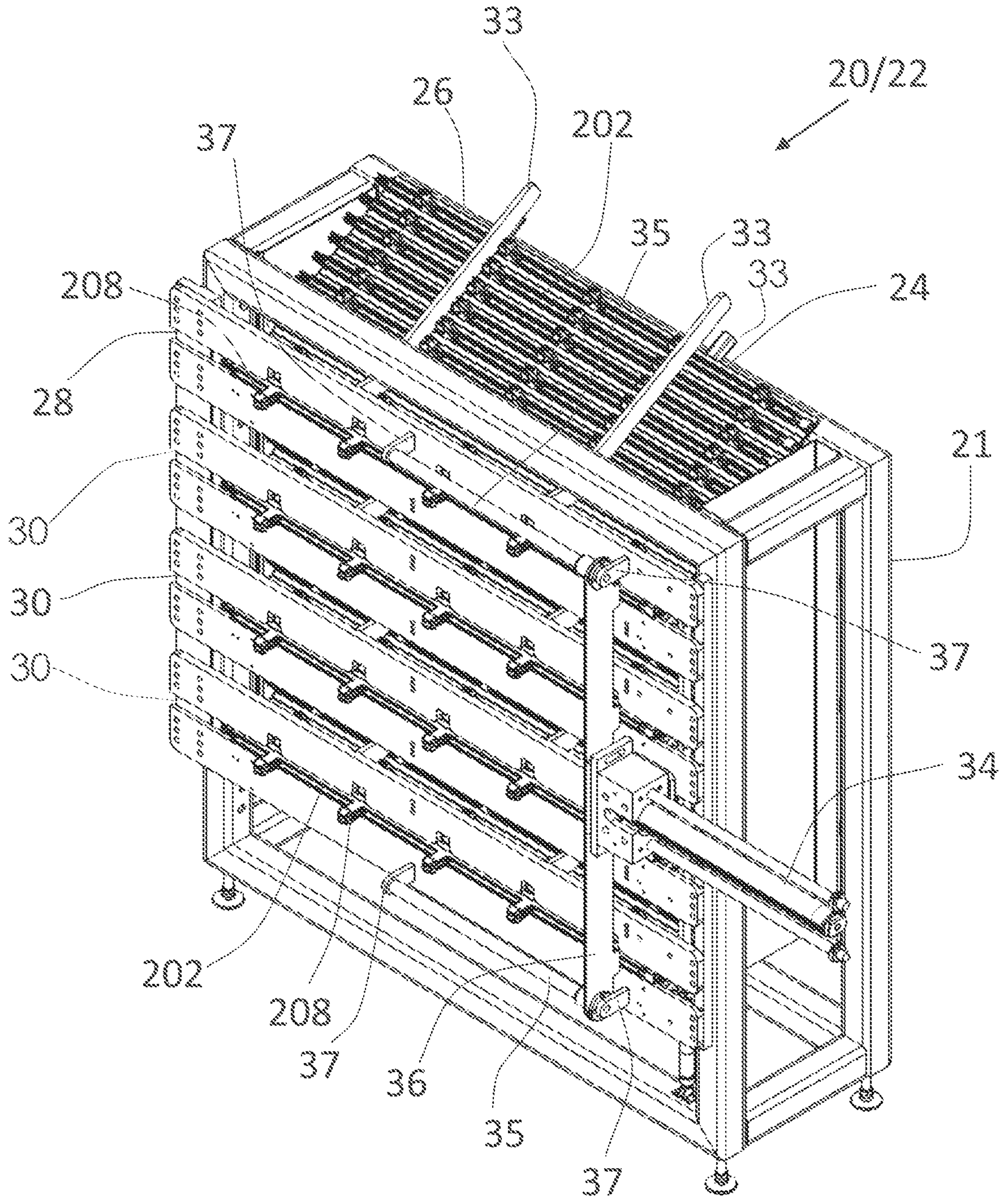
FIG. 5 is a perspective view of one side of a strap loading assembly shown in FIG. 3.

Referring to FIG. 2, assembly machine 12 may have a strap loading assembly 18 that is made up of a first side 20 and a second side 22. In the embodiment shown, each of first side 20 and second side 22 may have a support structure 21. First side 20 and second side 22 may be positioned in opposite and parallel spaced relation to each other. In the embodiment shown, first side 20 and second side 22 are substantially mirror images of each other, however a person of skill will understand that first side 20 and second side 22 may be different. Referring to FIG. 3, each of the first side 20 and the second side 22 has at least one feeder 24. In the embodiment shown, a plurality of feeders 24 which are positioned parallel to one another and spaced vertically from each other are used. Feeders 24 are attached to support structure 21. In the embodiment shown, there are four feeders 24, however the number of feeders 24 required is dependent upon the number of straps 202 used to create the insulated concrete form skeleton 200. Each feeder 24 may have a loading end 26 for loading straps 202 into the feeder 24 and a press assembly feeding end 28 which positions the straps 202 in a guide, such as a guide channel 30, in preparation for movement into a press assembly 32, shown in FIG. 2. In the embodiment shown, feeders 24 are slanted downwards from loading end 26 to press feeding end 28 such that gravity is used to assist with loading straps 202 into guide channel 30. It will be understood by a person skilled in the art that feeders 24 may be horizontal with loading of straps 202 into guide channels 30 occurring through contact between second side 22 as straps 202 are fed into feeders 24. Referring to FIG. 4, as can be seen, straps 202 may be positioned within guide channels 30 such that the male connectors 208 of the straps 202 in first side 20 are pointed towards second side 22 and the male connectors 208 of the straps 202 in second side 22 are pointed towards first side 20. It will be understood that rotation of straps 202 into this orientation may occur in feeders 24, in guide channels 30 or in the press assembly 32. Referring to FIG. 5, in the embodiments shown, feeders 24 may have positioning bars 33 positioned such that the positioning bars situate straps 202 in side by side relationship with each other and prevents straps 202 from becoming bunched within feeder 24. By preventing bunching, straps 202 are less likely to jam within feeder 24 or as they enter guide channels 30. While not shown, straps 202 could be positioned in feeders such that rotation of straps 202 into guide channels 30 is not required. The distance between the press feeding ends 28 and guide channels 30 is dependent upon the spacing between straps 202 needed for construction of the completed insulated concrete form skeletons 200. Assembly machine 12 may be disconnected and reassembled to adjust for other sizes of insulated concrete form skeletons 200.

The straps 202 may be movable along the guide channels 30 toward the press assembly 32. Movement along the guide channels 30 can occur manually by having the operator of assembly machine 12 push the straps 202 or may be done through automated means such as through the use of rams, pistons, rollers or other driving means. In one embodiment, movement of straps 202 along guide channels 30 may be achieved through the use of a ram 34. Referring to FIG. 5, in the embodiment shown, ram 34 may have a vertical pushing arm 36 which contacts the plurality of straps 202 in guide channels 30 and pushes the straps 202 towards press assembly 32. In the embodiment shown, vertical pushing arm 36 may be movably connected to guide bars 35 positioned near the top and the bottom of first side 20 and second side 22. Guide bars 35 may have stops 37 on both ends to control the distance vertical pushing arm 36 may move along each of first side 20 and second side 22. Vertical pushing arm 36 maintains its vertical orientation during movement along guide bars 35 and movement of ram 34. It will be understood by a person skilled in the art that a plurality of rams could be used where each ram moves a single strap 202. Ram 34 may be operated by any suitable method, including but not limited to, pneumatically, hydraulically or electrically operated mechanisms.

Figure 7:
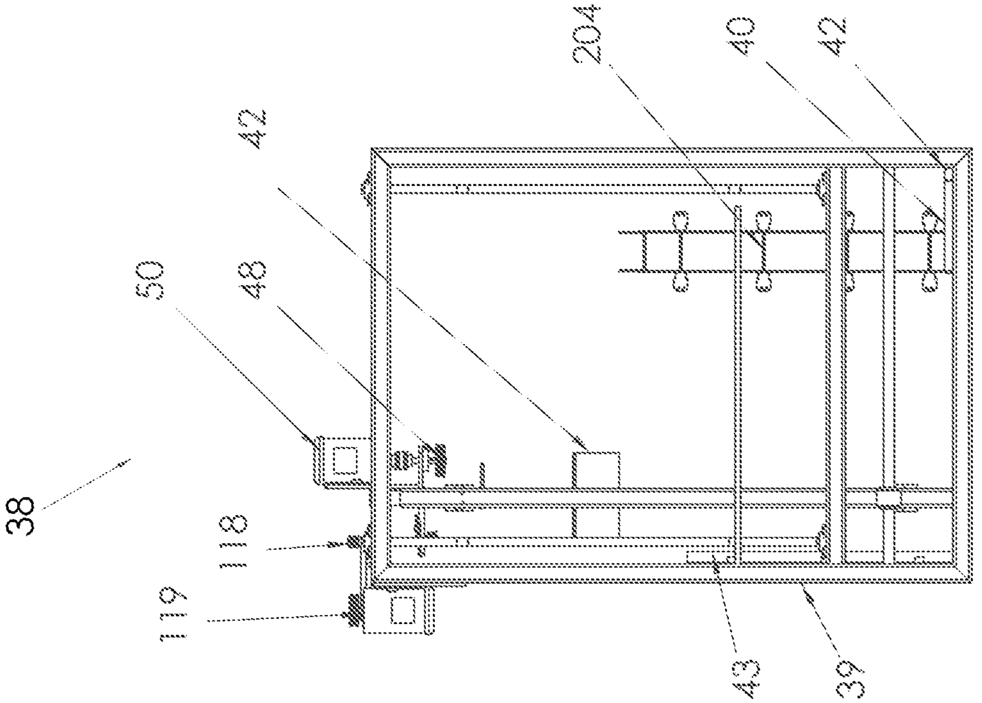
FIG. 7 is a side elevation view of the ladder loading assembly shown in FIG. 6.
Figure 6:
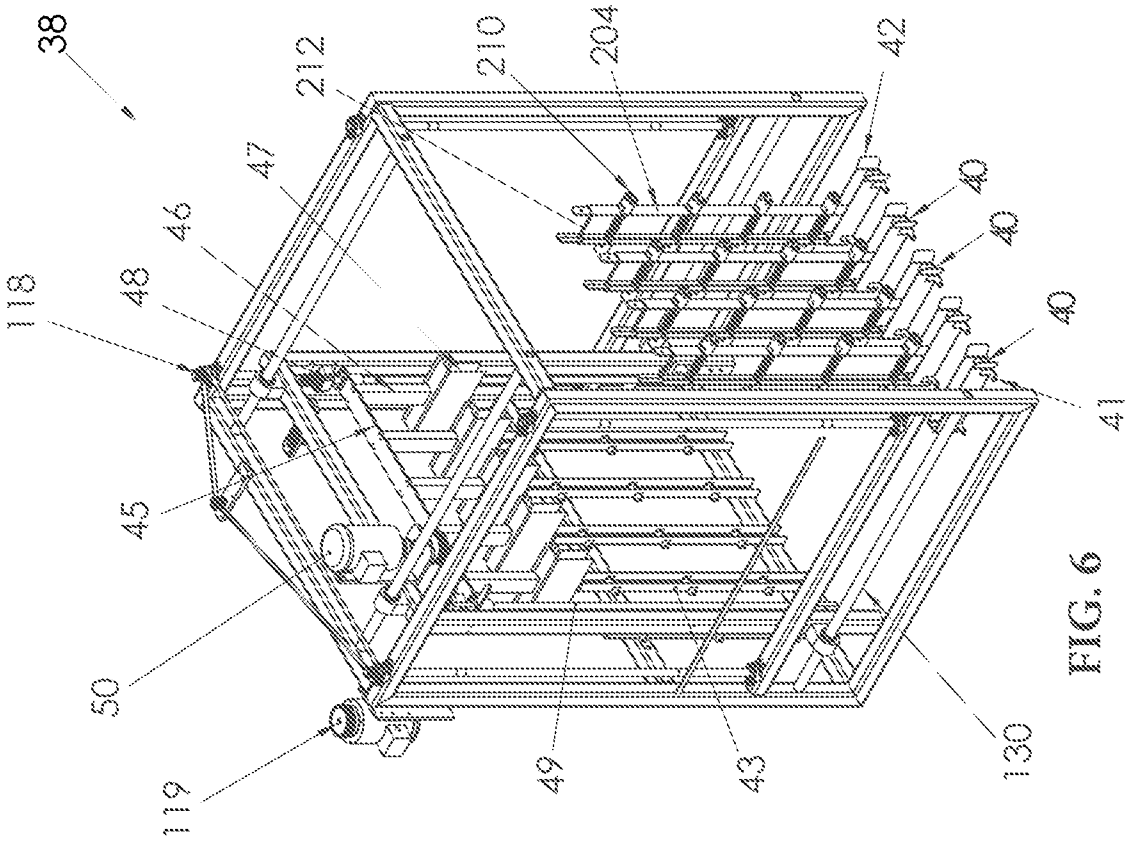
FIG. 6 is a perspective view of a ladder loading assembly.
Figure 8:
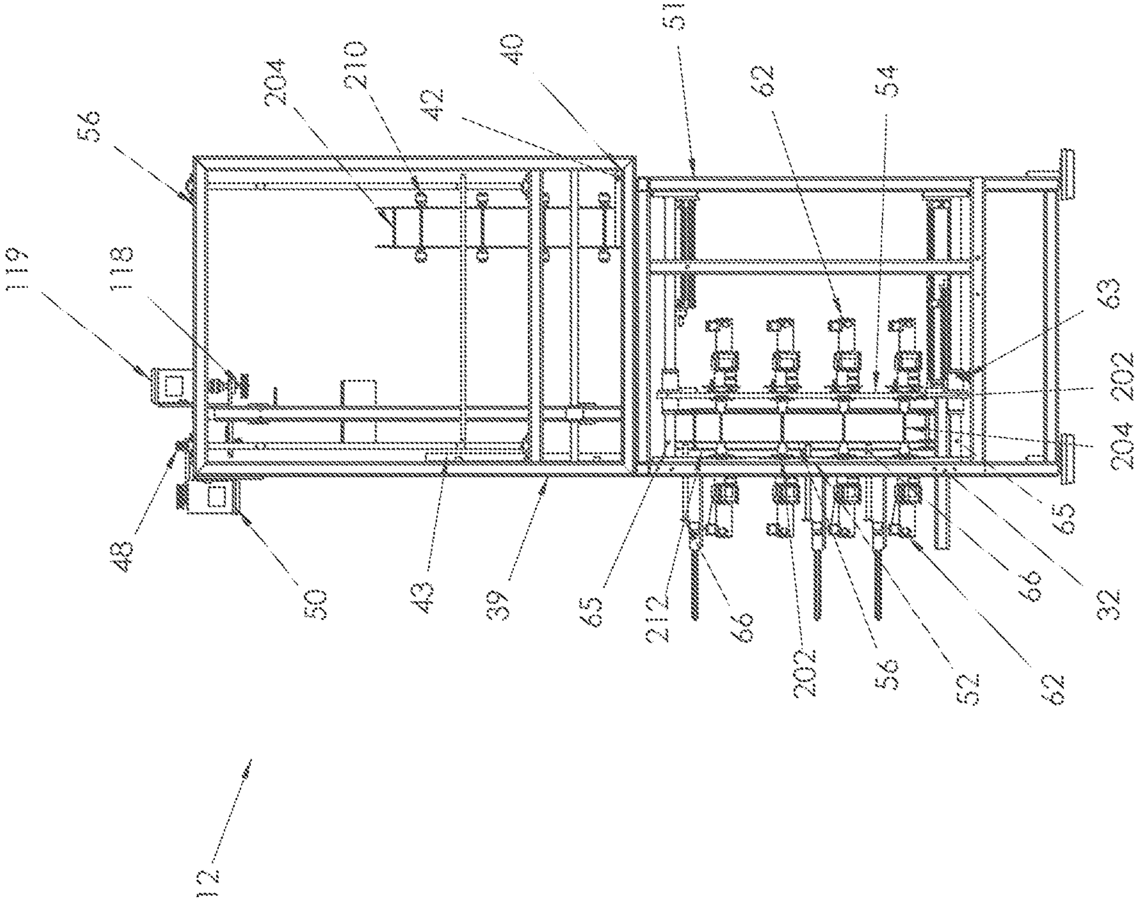
FIG. 8 is an entrance end elevation view of the ladder loading assembly and press assembly for the construction of an insulated concrete form prior to the straps and ladder being compressed and connected.
Figure 9:
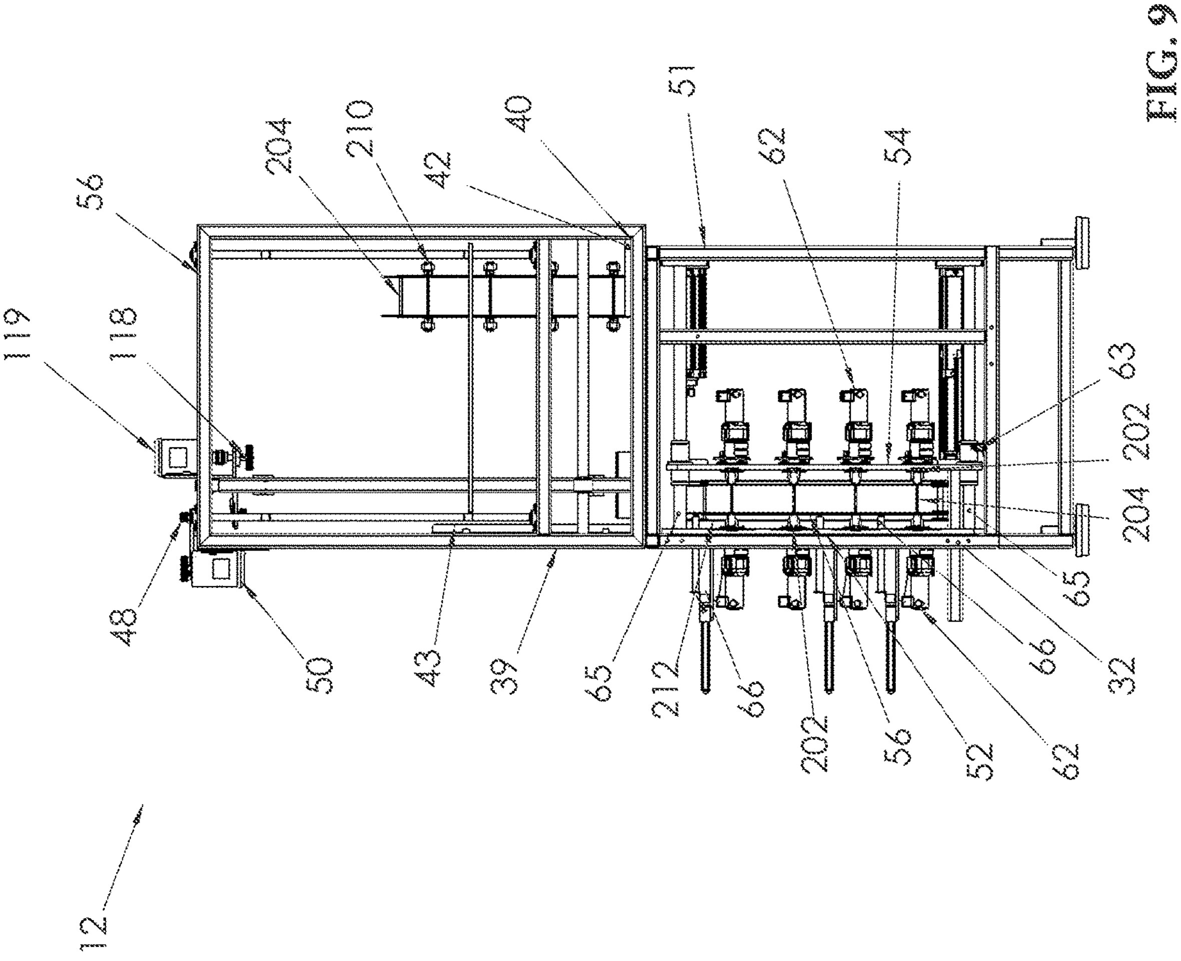
FIG. 9 is an entrance end elevation view of the ladder loading assembly and press assembly for constructing a skeleton of an insulated concrete form after the straps and ladder have been compressed and connected.

Referring to FIG. 2, assembly machine 12 may have a ladder loading assembly 38. Assembly 38 may have at least one ladder guide, such as a loading channel 40. Referring to FIG. 6 and FIG. 7, in the embodiment shown, a plurality of loading channels 40 positioned parallel to one another and spaced horizontally from each other may be used. The spacing between loading channels 40 is dependent upon the space required between strap receiving ladders 204 in insulated concrete form skeleton 200, shown in FIG. 26. Ladder loading assembly 38 may have a support structure 39 onto which loading channels 40 are attached. The number of loading channels 40 that are required is dependent upon the number of strap receiving ladders 204 used to create the insulated concrete form skeleton 200. Each loading channel 40 may have a loading end 42 into which strap receiving ladders 204 are loaded and a set of rams 47 which feeds the strap receiving ladders 204 into the press assembly 32. The strap receiving ladders 204 may be movable along the loading channels 40 and through the small rams 47 of each loading channel 40 into the press assembly 32. Referring to FIG. 6, loading channels 40 may have rollers 41 that may be used to advance strap receiving ladders 204 along loading channels 40. Referring to FIG. 8 and FIG. 9, in the embodiment shown, ladder loading assembly 38 may be positioned above press assembly 32 and strap receiving ladders 204 are gravity fed into press assembly 32. In the embodiment shown, assembly machine 12 of loading channels 40 may have a guide channel 43 connected to support structure 39. Referring to FIG. 9, female connectors 210 of strap receiving ladders 204 slide into guide channel 43 and are grabbed by actuators such as small rams 47 and guide channels 43 act to guide strap receiving ladders 204 out of ladder loading assembly 38 and into guide channel 43. A person of skill will understand that the descent of strap receiving ladders 204 into press assembly 32 may be controlled through the use of a vertically movable piston in connection with strap receiving ladders 204, a plurality of vertically movable pistons in connection with strap receiving ladders 204, an elevator system which lowers the strap receiving ladders 204, or any other suitable means of controlling the descent of strap receiving ladders. Referring to FIG. 6, in the embodiment shown, each strap receiving ladder 204 may be moved downwards through the use of a moving assembly 45 which has a series of connectors 46 which removably connect at the top 212 of the strap receiving ladders 204. As can be seen, connectors 46 may have a set of small rams 47 that are used to grab onto strap receiving ladder 204 that move towards the strap receiving ladder 204 to grab the strap receiving ladder 204 using a pulley system 118 driven by a motor 119 and linear guide 130 and another pulley system 48 driven by a motor 50 allows the moving assembly 45 to move downwards into the press assembly 32. A guide bar 49 positioned within support structure 39 beside loading channels 40 may be used to guide moving assembly 45 vertically into and out of press assembly 32, shown in FIG. 8. A person of skill will understand that moving assembly 45 may be movable by other means. Once the strap receiving ladders 204 has been lowered, small rams 47 of the connectors 46 release from the strap receiving ladder 204 and moves back up into ladder loading assembly 38 in preparation for downwards and sideways movement of another strap receiving ladder 204.

A person of skill will understand that straps 202 could be spaced horizontally from each other with strap receiving ladders 204 being spaced vertically from each other within press assembly 32. Straps 202 should be positioned perpendicular to strap receiving ladders 204.

Figure 10:
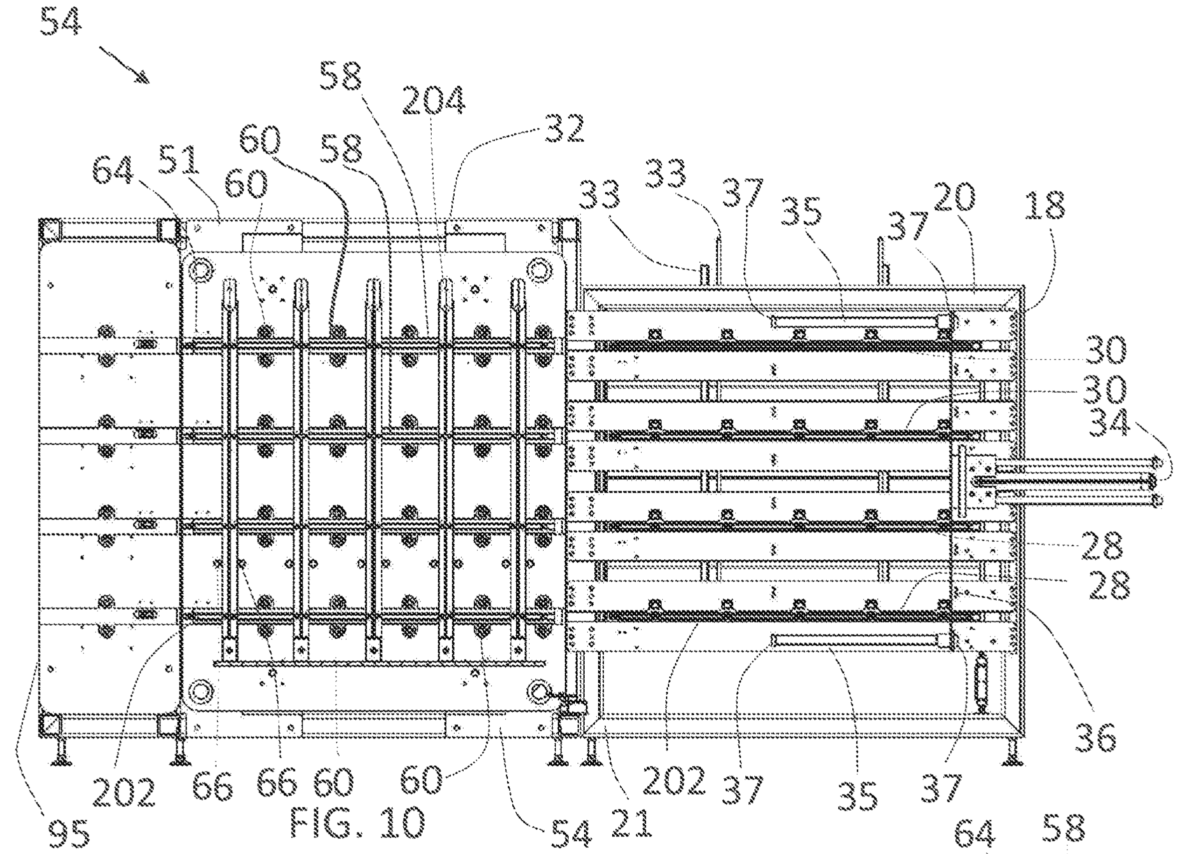
FIG. 10 is a cross sectional view of a dynamic side of the strap loading assembly and press assembly used in the construction of a skeleton of an insulated concrete form.
Figure 11:
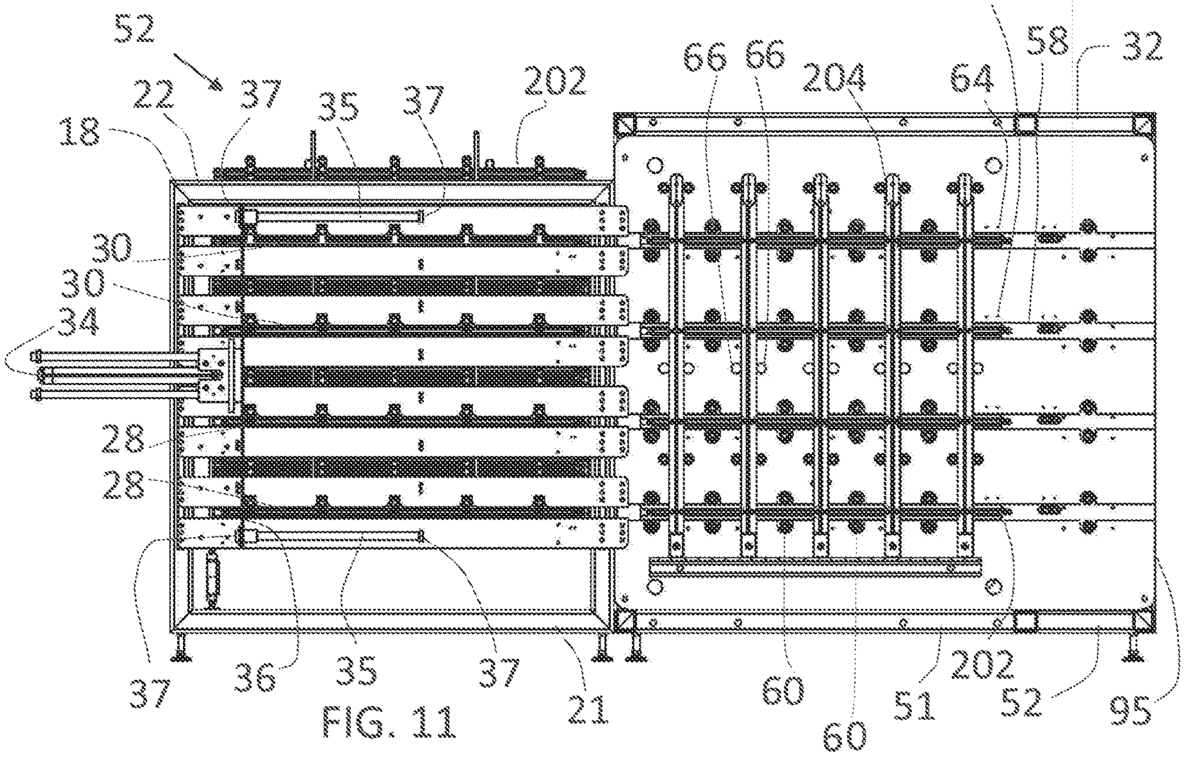
FIG. 11 is a cross sectional view of a static side of the strap loading assembly and press assembly used in the construction of a skeleton of an insulated concrete form.
Figure 12:
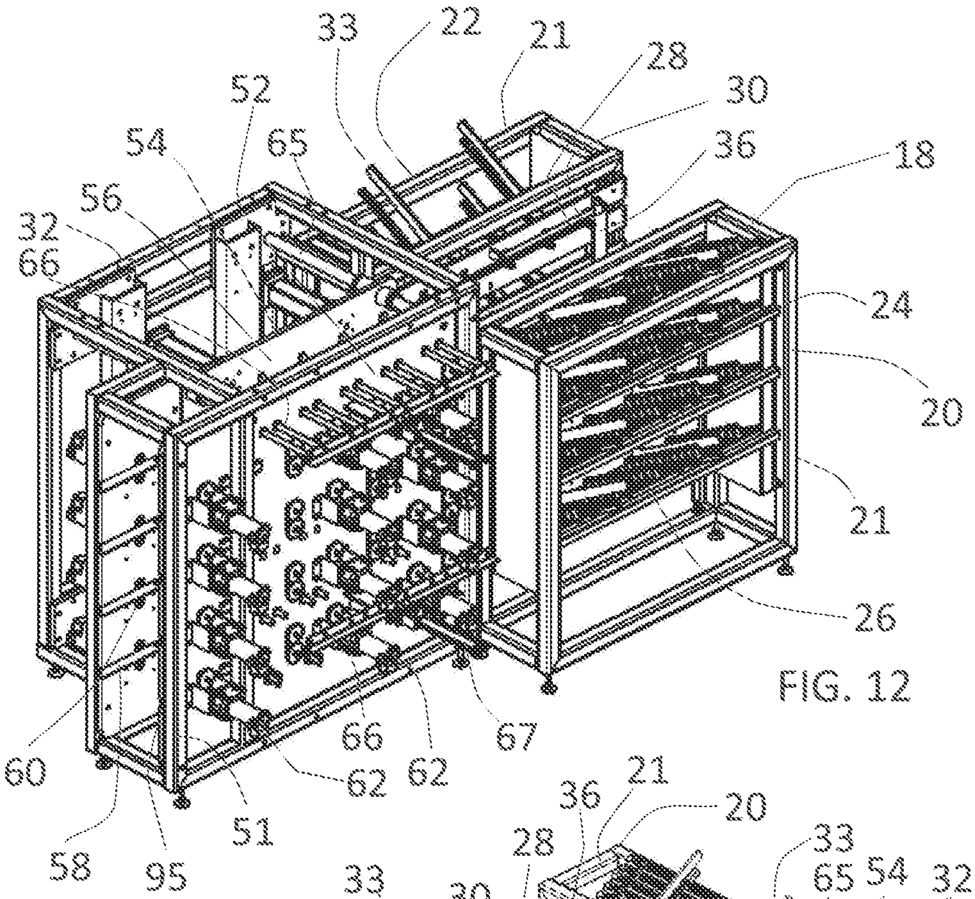
FIG. 12 is a rear perspective view of the apparatus for constructing a skeleton of an insulated concrete form.
Figure 13:
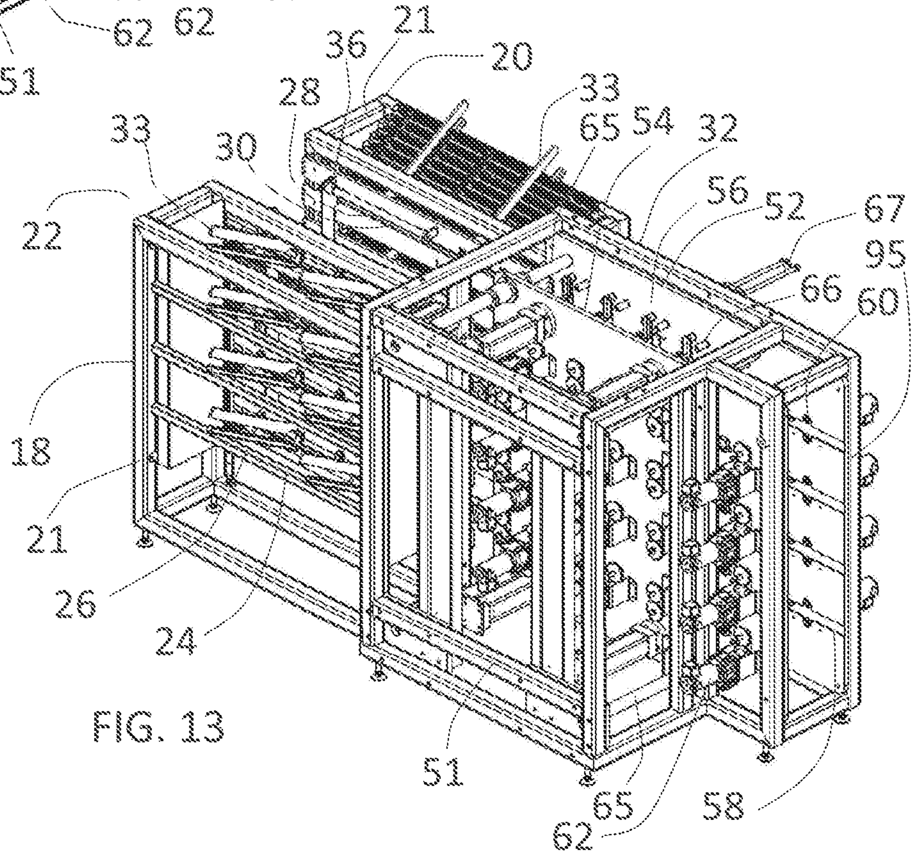
FIG. 13 is a front perspective view of the apparatus for constructing a skeleton of an insulated concrete form.
Figure 14:
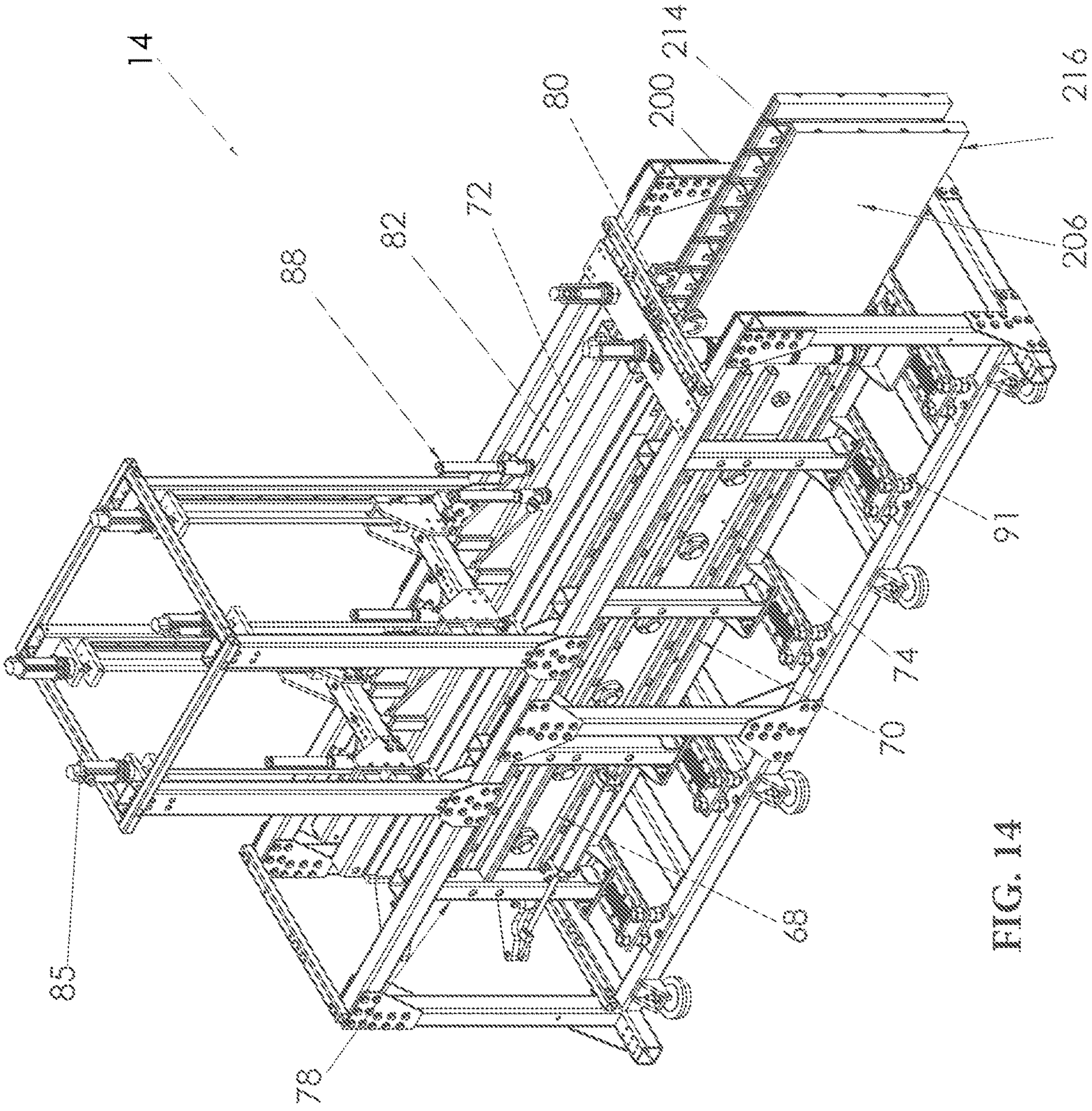
FIG. 14 is a perspective view of a mold used in the construction of insulated concrete forms.

Referring to FIG. 8 and FIG. 9, assembly machine 12 has a press assembly 32 that may be used to connect straps 202 and strap receiving ladders 204 together to form an insulated concrete form skeleton 200, shown in FIG. 26. Referring to FIG. 8 and FIG. 9, press assembly 32 may have a support structure 51, a first side 52 and a second side 54 with the space between the first side 52 and the second side 54 defining a press cavity 56. Referring to FIG. 10 and FIG. 11, each of the first side 52 and the second side 54 may have at least one strap guide, such as guide channel 58. In the embodiment shown, a plurality of guide channels 58 that are continuous with the guide channels 30 of the strap loading assembly 18 may be used. The straps 202 may be movable from the guide channels 30 of the strap loading assembly 18 though the guide channels 58 of the press assembly 32. Movement of the straps 202 may occur through manual or automated means including, but not limited to, the use of rams, pistons, rollers or other driving means. In the embodiment shown, a series of rollers 60 which are driven by electric motors 62, shown in FIG. 12 and FIG. 13, may be provided for moving the straps 202 along guide channels 58. The guide channels 58 of the press assembly 32 may have a stop 64 that is used to position the straps 202 such that the straps 202 and the strap receiving ladder 204 are aligned for connection within press assembly 32 as shown in FIG. 8. A person of skill will understand that stop 64 may be created through the use of a physical barrier, a mechanical switch, an optical switch or any other suitable means of stopping progress of the straps 202 within guide channels 58. In the embodiment shown, an optical switch may be used. Referring to FIG. 8 and FIG. 9, once straps 202 and strap receiving ladders 204 are positioned within press assembly 32, at least one of the first side 52 and the second side 54 may be movable within support structure 51 to press the straps 202 and strap receiving ladders 204 into connection with each other to form an insulated concrete form skeleton 200, shown in FIG. 26. Referring to FIG. 9, in the embodiment shown, second side 54 may be movable while first side 52 is stationary. Second side 54 may be movable through the use of pneumatic pistons 65 positioned adjacent the top and bottom of press cavity 56. Pneumatic piston 65 positioned adjacent the bottom of press cavity 56 may have a stop 63 to prevent insulated concrete form skeleton 200 from being over pressed which would cause insulated concrete form skeleton to twist or break. Stop 63 may be positioned on pneumatic piston 65 adjacent the top of press cavity 56 or stop 63 may be mechanically or electronically built in. A person of skill will understand that second side 54 may be movable in other ways known in the art. It will also be understood that both first side 52 and second side 54 could be movable to press straps 202 and strap receiving ladder 204 into connection to form insulated concrete form skeleton 200, shown in FIG. 26. Referring to FIG. 12 and FIG. 13, press assembly 32 has an exit 95 through which completed insulated concrete form skeletons 200 may be removed from press cavity 56. Referring to FIG. 10 and FIG. 11, exit 95 may have a series of rollers 60 which are used to propel insulated concrete form skeleton 200 out of press cavity 56.

Referring to FIG. 10 and FIG. 11, in order to ensure that straps 202 and strap receiving ladders 204 are properly aligned, ladder guides 66 may be positioned within press assembly 32 and may extend inwards from either first side 52 or second side 54. Ladder guides 66 may be used to position the strap receiving ladders 204 in alignment with the straps 202 for connection. Referring to FIG. 8 and FIG. 9, guide channels 43 guide strap receiving ladders 204 into press cavity 56 such that they are positioned within ladder guides 66 or such that the ladder guides 66 can be correctly positioned around strap receiving ladders 204 that have been lowered into press cavity 56. Referring to FIG. 12, in the embodiment shown, ladder guides 66 may be movable between a guiding position in which the ladder guides 66 extend into the press cavity 56 and a retracted position in which the ladder guides 66 retract out of press cavity 56. Ladder guides 66 may be movable into and out of press cavity 56 through the use of pneumatic pistons 67. In the embodiment shown, there are two sets of ladder guides 66, one set positioned to guide the lower half of strap receiving ladder 204 and a second set positioned to guide the upper half of strap receiving ladder 204. As can be seen, the set of ladder guides 66 positioned to guide the upper half of strap receiving ladder 204 is retracted out of press cavity 56, while the set of ladder guides 66 positioned to guide the lower half of the strap receiving ladder 204 is extended into press cavity 56. A person of skill will understand that different methods of moving ladder guides 66 may be used and may include ladder guides 66 being movable between a guiding position in which they extend outwards from the first side 52 or second side 54 and a discreet position in which they are folded back against the first side 52 or second side 54. In one case both sides of the press assembly move to connect the ladders and straps.

Figure 15:
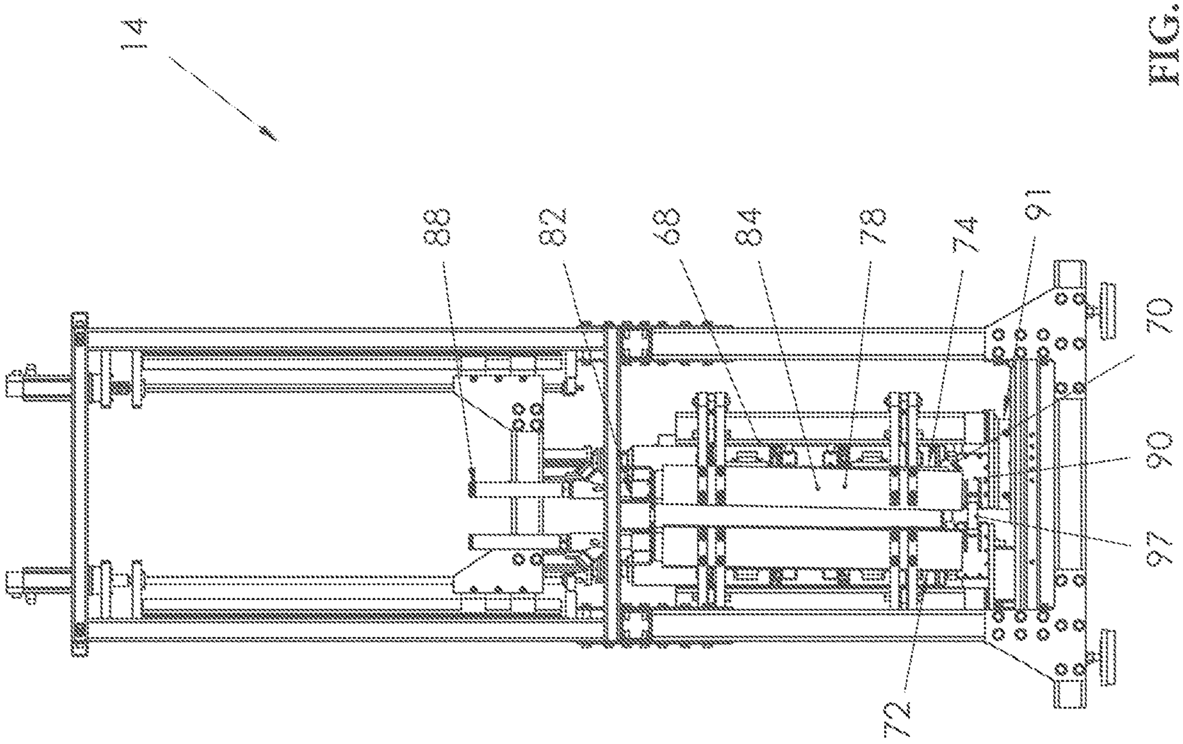
FIG. 15 is an entrance side elevation view of the mold shown in FIG. 14.
Figure 16:
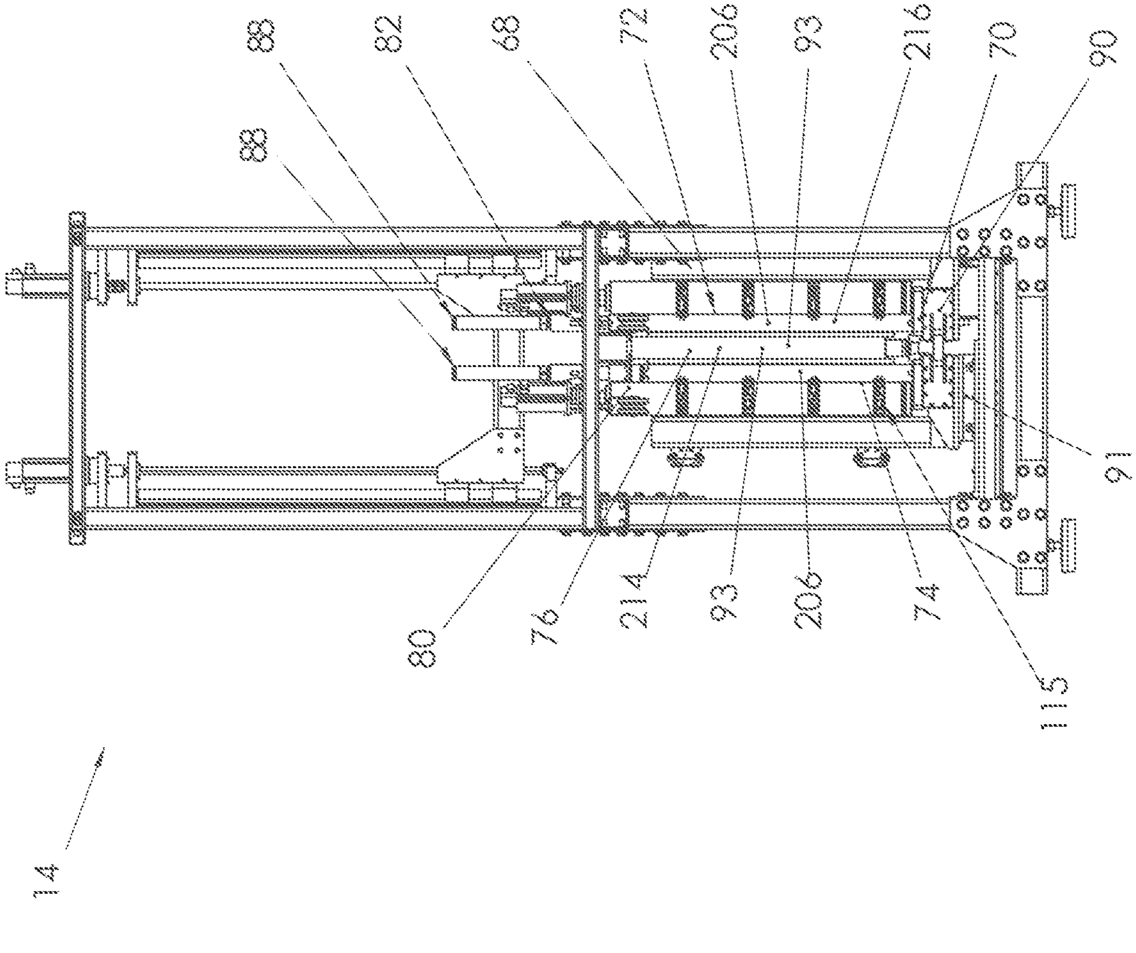
FIG. 16 is an exit side elevation view of the mold shown in FIG. 14.
Figure 17:
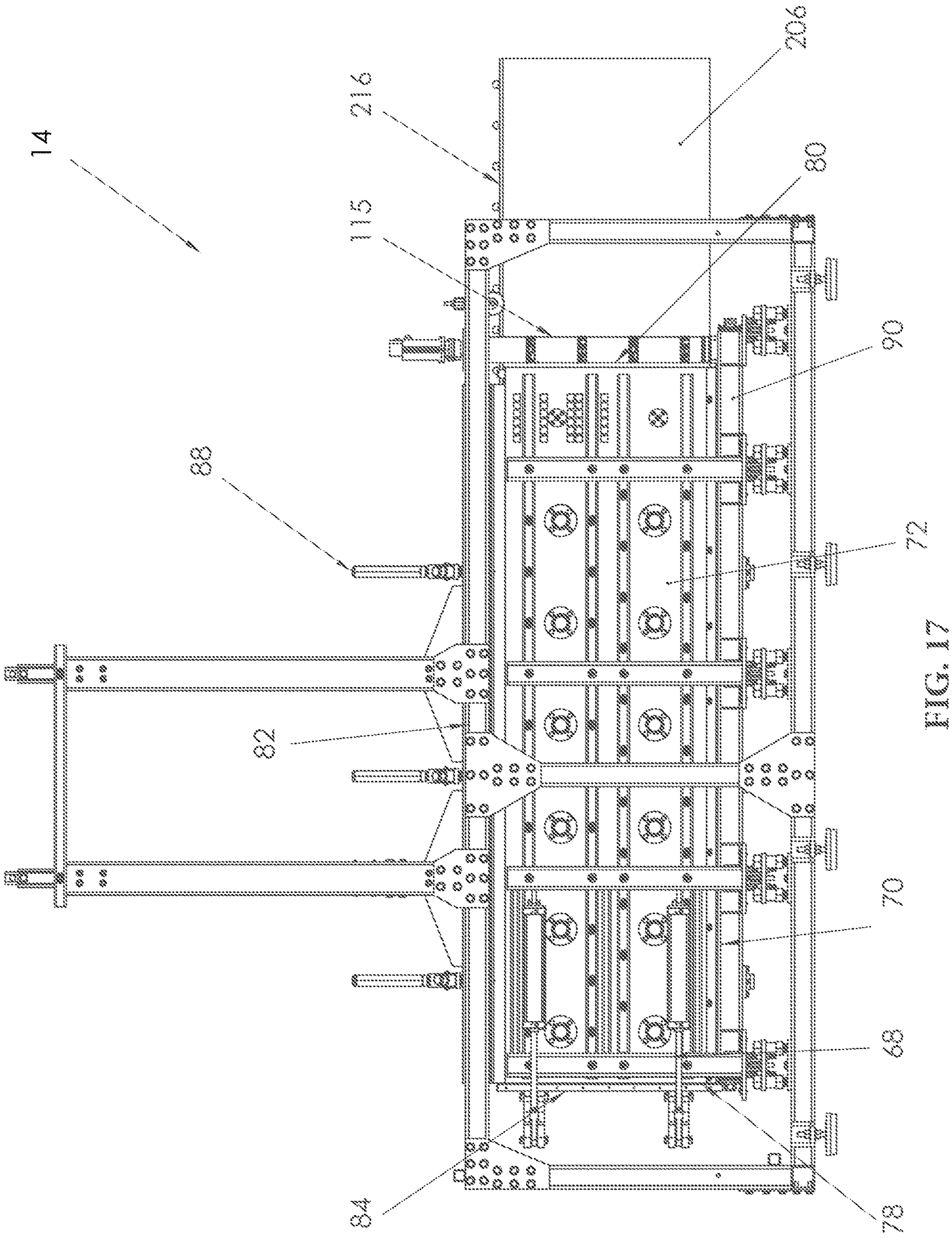
FIG. 17 is a side elevation view of the mold shown in FIG. 14.
Figure 18:
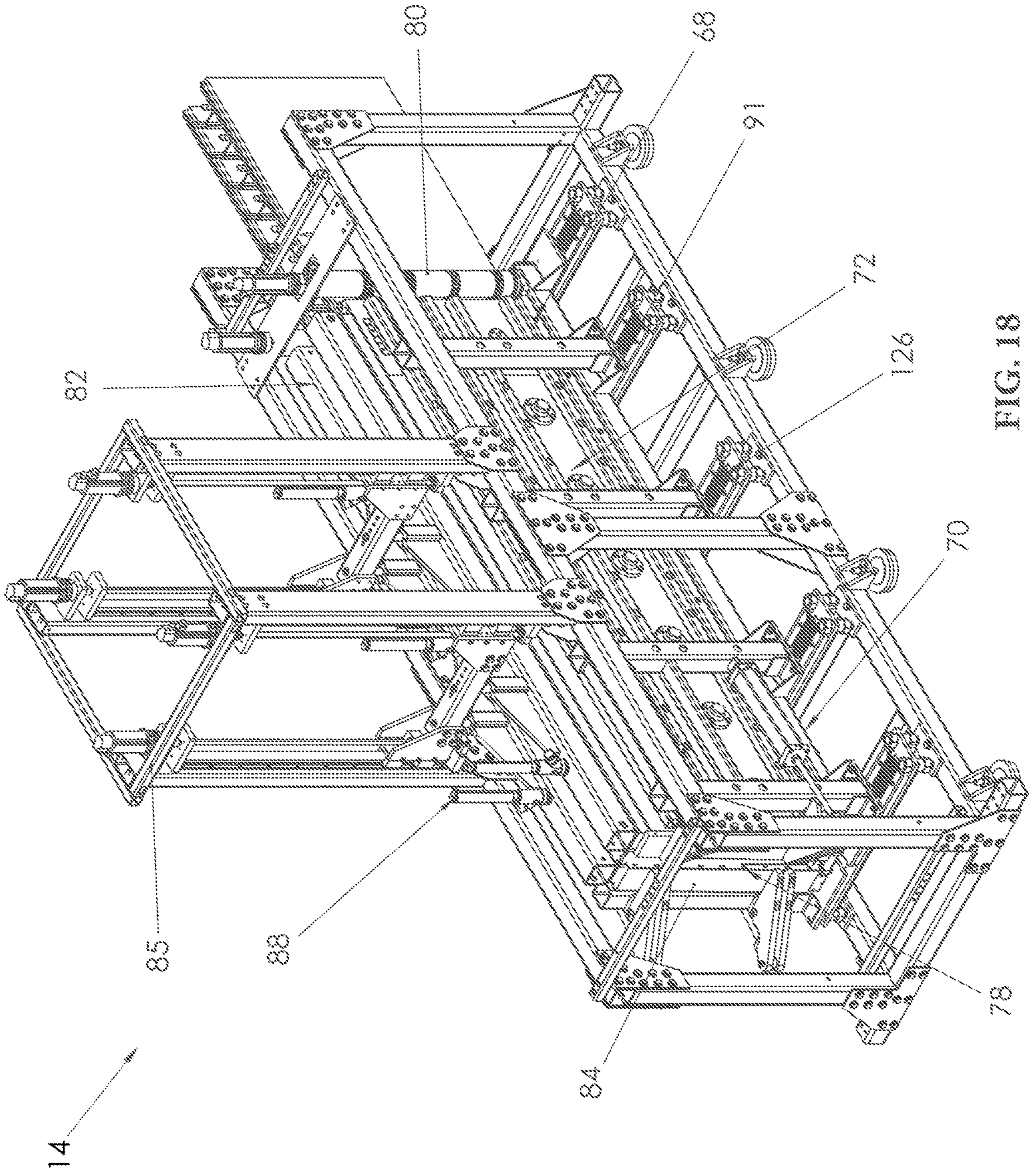
FIG. 18 is a perspective view of the mold shown in FIG. 14 in a closed position.
Figure 19:
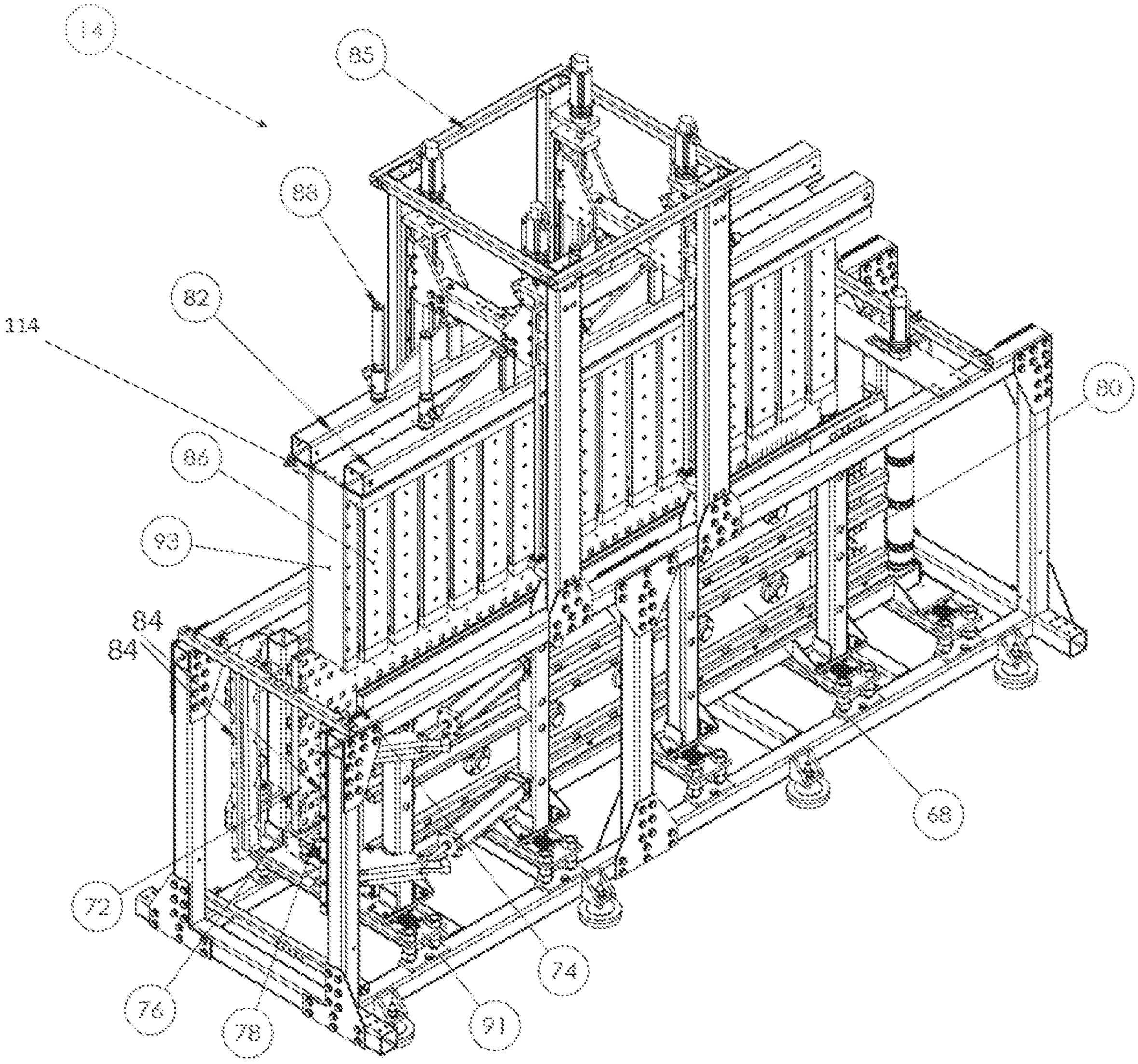
FIG. 19 is a perspective view of the mold shown in FIG. 14 in the open position.
Figure 20:
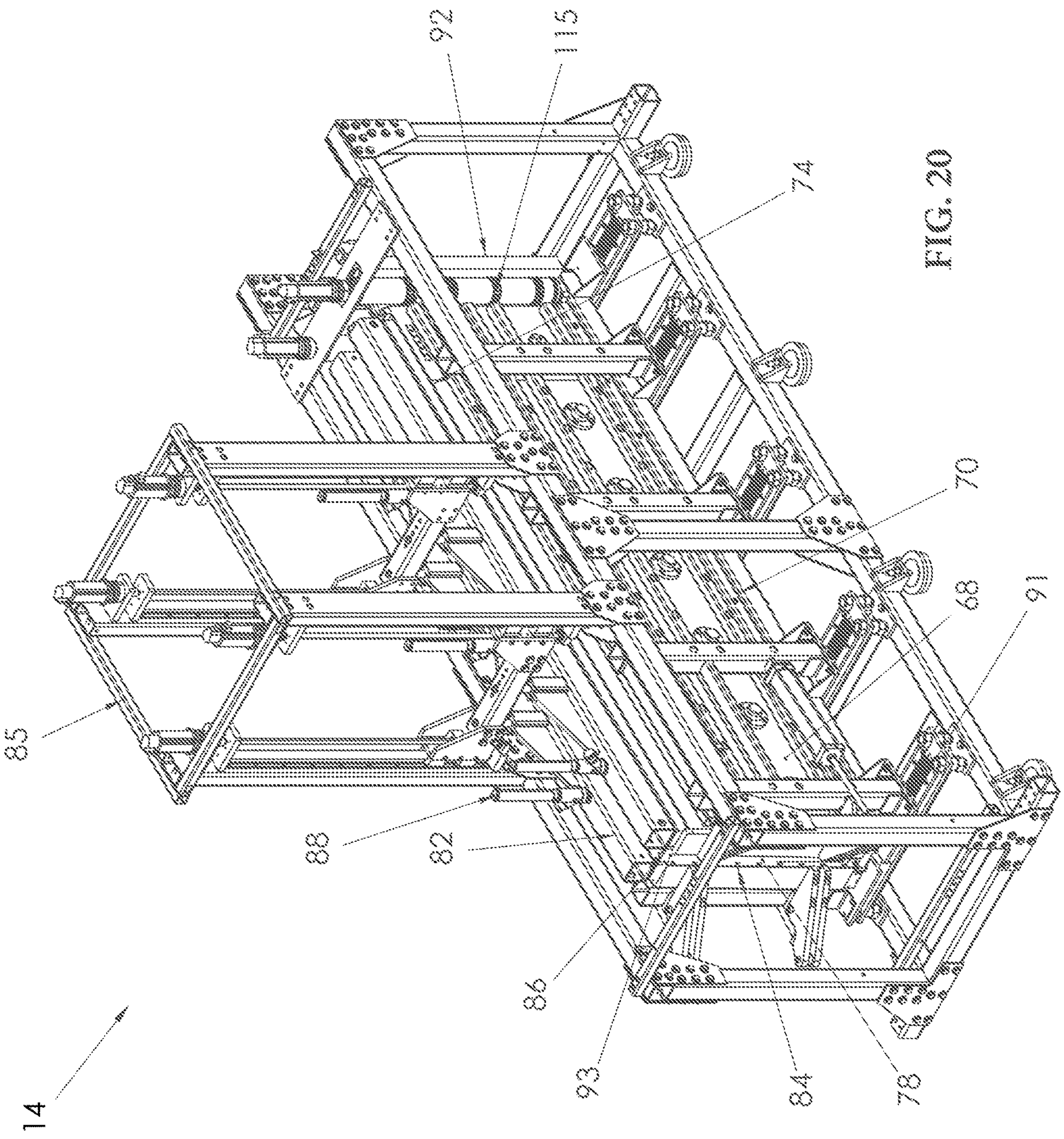
FIG. 20 is a perspective view, partially in section, of the mold shown in FIG. 14.
Figure 29A:
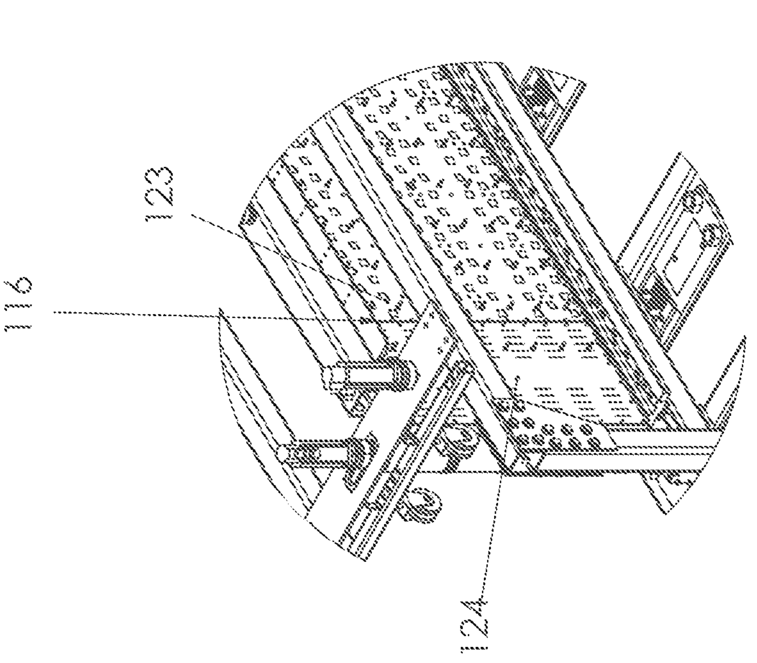
FIGS. 29 and 29A are a depiction of the method of separation between the cooling side and steam face.
Figure 29:
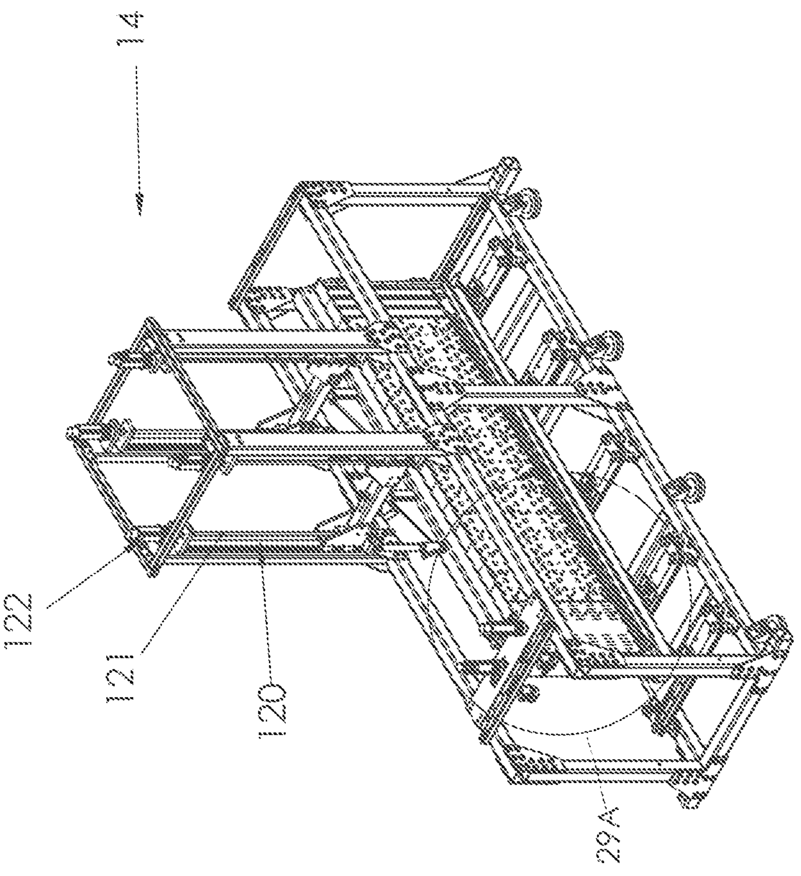

Referring to FIG. 17 and FIG. 18, mold assembly 14 may be used to mold foam material 206 onto an insulated concrete form skeleton 200. Referring to FIG. 16, mold assembly 14 may have an outer housing 68 and a bottom support base 70, a first side wall 72 and a second adjustable side wall 74 which define an interior cavity 76, and mold assembly 14 may be supported by a main framing 11. Referring to FIG. 15, the outer housing 68 may have an entrance 78 for access to the interior cavity 76 and, referring to FIG. 16, the outer housing 68 may have an exit 80 for access to the interior cavity 76. Two independent lids 82 may be sized to seal the interior cavity 76 of the outer housing 68. In other cases one lid is used. The lids 82 may be movable between an open position, shown in FIG. 19, and a closed position, shown in FIG. 18. Referring to FIG. 19, in the open position, access to the interior cavity 76 may be provided through the entrance 78 and exit 80 of the outer housing 68. Referring to FIG. 18, in the closed position, access to the interior cavity 76 may be limited. Referring to FIG. 18, the outer housing 68 may have two sealing door mechanisms 84 to seal the entrance 78 of the outer housing 68 when the lids 82 are in the closed position. In other cases one door is used. Referring to FIG. 19 and FIG. 20, first and second pluralities of downward oriented extensions 86 may be movable between a retracted position (open position) and an inserted position (closed position). The first and second pluralities of downward oriented extensions 86 are in the inserted position, first and second mold cavities are defined by the first and second mold lids, the first and second entrance door mechanisms 84, the first and second pluralities of downward oriented extensions 86, and the insulated concrete form skeleton (with the extensions and skeleton contacting one another in use to define respective inside walls of the mold cavities so that a seal is formed around the top, bottom, ends, and inside and outside walls of each mold cavity to permit insulating material to fill the mold cavities and form the requisite insulating panels on the skeleton). In the example shown the extensions 86 may protrude from the lids 82. The extensions 86 may be connected to a mounting block 114. The downward oriented extension 86 may be positioned such that they may allow for the creation of form respective insulating panel forming mold cavities such as voids 214, shown in FIG. 14, in the molded insulated concrete form 216, shown in FIG. 14. The downward oriented extensions 86 may be positioned within an interior of the insulated concrete form skeleton 200 between the straps 202 positioned on either side of the strap receiving ladders 204. The first and second pluralities of downward oriented extensions 86 may be inserted into a series of spaces, for example vertical spaces, defined by and along opposed sides of an insulated concrete form skeleton that is located within the interior cavity in use. The inserted or descending extensions may align into the connected pluralities/skeleton to create the mold cavity. Once molded/formed the extensions may be retracted to release the molded monolithic form. Entrance and exit rollers and drive wheels, may push and pull (extract) the molded form. This extraction process connects the pre-staged attached/connected skeleton/pluralities to the previous molded skeleton/pluralities creating a monolithic continuous molded ICF form. When foam is injected into the mold assembly 14, it may not enter the area between the straps 202 positioned on either side of the strap receiving ladders 204 as these areas are blocked by the downward oriented extensions 86 which are supported by spacer plates 93 which also help reduce chances of buckling, shown in FIG. 16. Each opposite group of extensions 86 may be supported by a spacer such as a spacer plate 93. Referring to FIG. 19, FIG. 18, and FIG. 29, the lids 82 may be movable between the open position, and closed position, through the use of the lifting system 85. The lifting system 85 may use heavy-duty linear guides 120, ball-screws 121, and motors 122 to lift the lids 82 into and out of position efficiently, at a set desired acceleration and speed, and may help to ensure that lids are properly aligned with the outer housing 68 and the bottom support base 70 and insulated concrete form skeleton 200 each time the lids 82 are moved. This, in turn, may prevent damage to the insulated concrete form skeleton 200 and consistent insulated concrete forms 216 being made. A person of skill will understand that different methods of moving the lids 82 upwards and downwards may be used including manually lifting and lowering the lid, hydraulics, the use of machinery such as a crane, pneumatics, and any other method known in the art. In some cases legs (extensions 86) may come from the top and bottom of the respective mold cavities. In some cases the extensions move independently of the lids.

Referring to FIG. 18, at least one fill gun 88 may be provided for the injection of foam beads or other suitable material into the interior cavity 76 of the mold assembly 14. A person of skill will understand that fill guns 88 may be positioned anywhere on mold assembly 14 as long as they are capable of injecting foam beads or other suitable material into the interior cavity 76. In one embodiment, a plurality of fill guns 88 are positioned on the lids 82. This orientation of fill guns 88 allows for more uniform injection of foam beads or other suitable material into the mold assembly 14. Referring to FIG. 17, a steam inlet/drain 90 and steam inlet 123 may be provided for the injection of steam into the interior cavity 76. The steam causes activation of the foam beads that are injected into the interior cavity 76 using fill guns 88. Referring to FIG.

20, high temperature rubber block plugs 92 may be provided. The high temperature plugs 92 seal the exit 80 of the outer housing 68 and may be used once while the lids 82 are closed for the first insulated concrete form 216. Referring to FIG. 20, when used in the creation of a monolithic insulated concrete form, the high temperature plugs 92 may be used to seal the exit 80 of the outer housing 68 during molding of the first insulated concrete form portion 216a. Once this portion 216a has been molded, it may be pushed mostly out of the mold assembly 14 by using a conveyor such as ejection rollers 115, shown in FIG. 17 and by the next insulated concrete form skeleton 200 which has been connected to it. Referring to FIG. 17, the first insulated concrete form portion 216a remains blocking the exit 80 while the next insulated concrete form skeleton 200 is molded. Once the first insulated concrete form 216 is molded, the blocking part such as the high temperature rubber plugs 92 may be removed. Referring to FIG. 29, a high temperature sealing mat 116 may be placed in-between the steam inlet 123 and the cold air injection system 124.

Figure 28A:
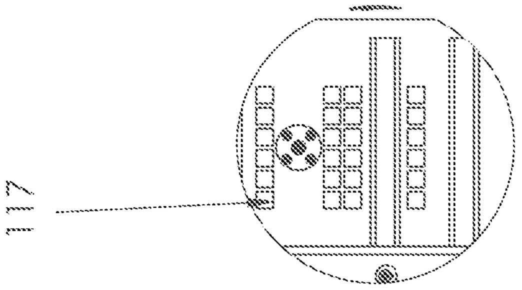
FIG. 28, 28A and 28B are views of the cooling system and method
Figure 28:
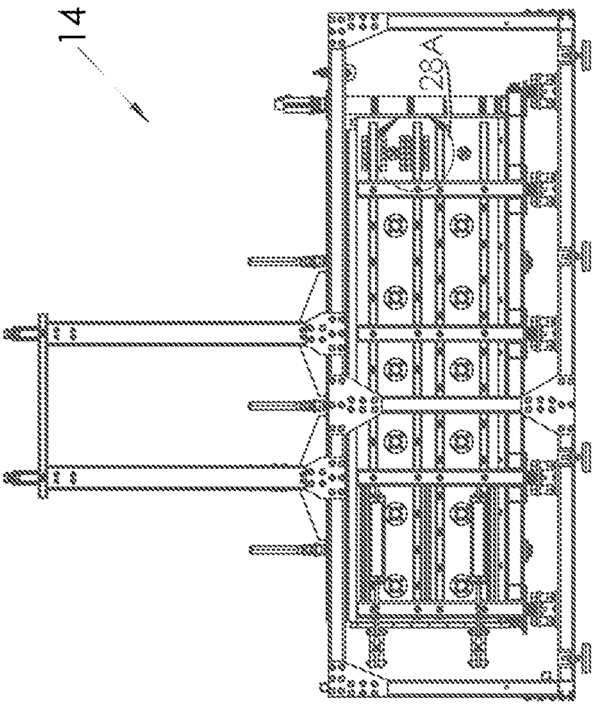
Figure 28B:
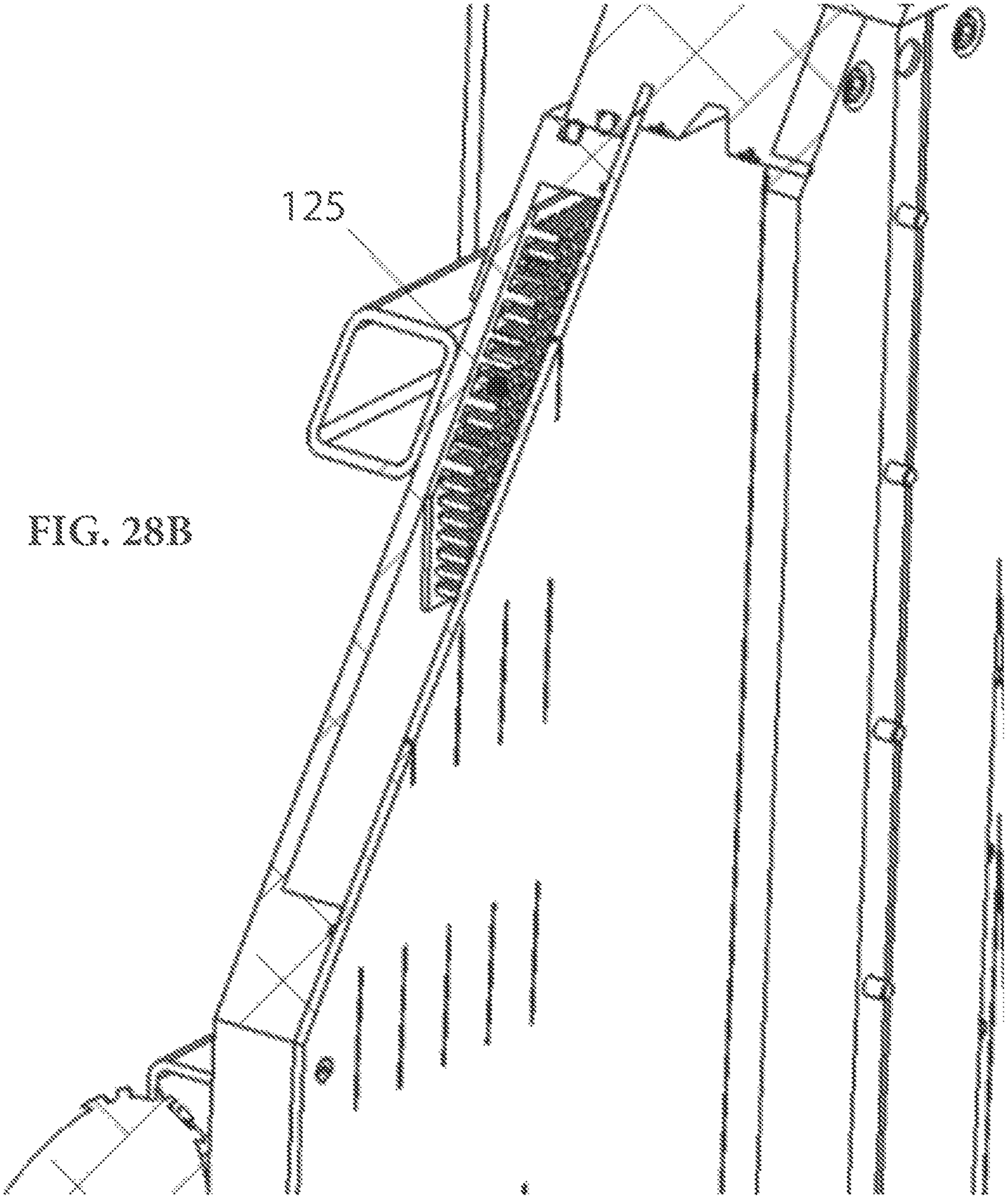

The high temperature sealing mat 116 separates the hot and cold sides from the insulated concrete form 216. The cold air injection system 124 cools down the insulated concrete form 216 to stop further growth of the expanded polystyrene and maintain its shape. Referring to FIGS. 28, 28A, and 28B, the cold air injection system 124 may use a thermoelectric cooler 117 and aluminum fins 125. A person of skill will understand that different methods of cooling the insulated concrete form 216 may be used including direct air, coolers, pressurized air, and any other method known. Referring to FIG. 20, As the insulated concrete form 216 is ejected by the ejection rollers 115, a product label may be debossed on the surface of the insulated concrete form 216.

Referring to FIG. 15, in the embodiment shown, mold assembly 14 may have bottom rollers 91 with removable spacer plates 93 and removable bottom spacers 97. By using removable spacer plates 93, the user may mold different sizes of cores of insulated concrete forms 216 by simply switching out the spacer plates 93 and bottom spacers 97 . It also allows for the spacer plates 93 to be replaced as they wear, without the requirement to obtain an entirely new mold assembly 14.

Figure 27:
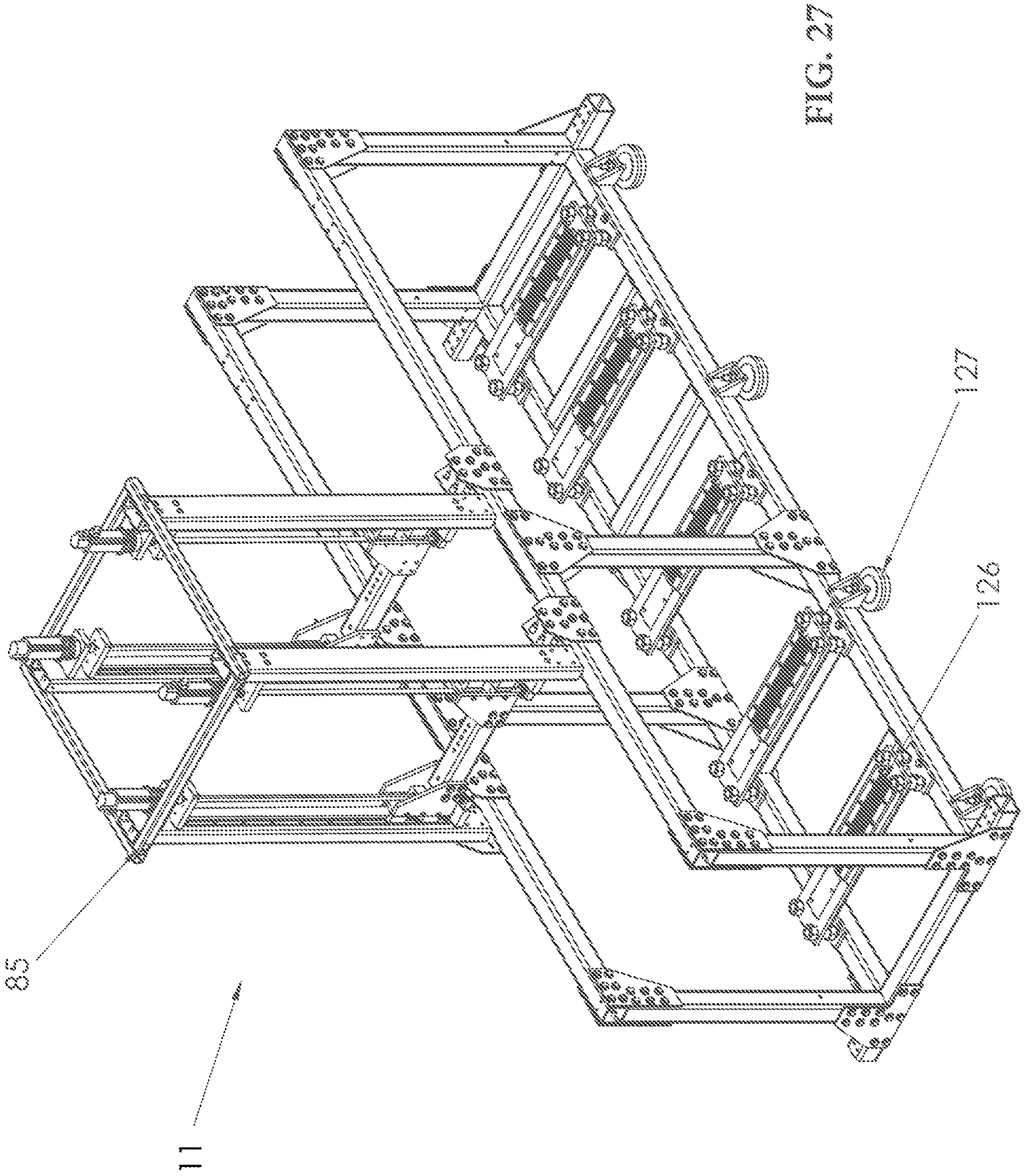
FIG. 27 is a perspective view of the main framing.

Referring to FIG. 27, the mold assembly 14 may have two sides. One side may be fixed to the mold assembly framing 11, while the other moving adjustable side may have bottom rollers 91 that may be placed on top of the linear guides 126 of the mold assembly framing 11. The mold assembly framing 11 may be supported by heavy duty leg stands 127. The lifting system 85 may be attached to the mold assembly framing 11. Mold assembly 14 and lifting system 85 may be supported by the mold assembly framing 11.

Figure 21:
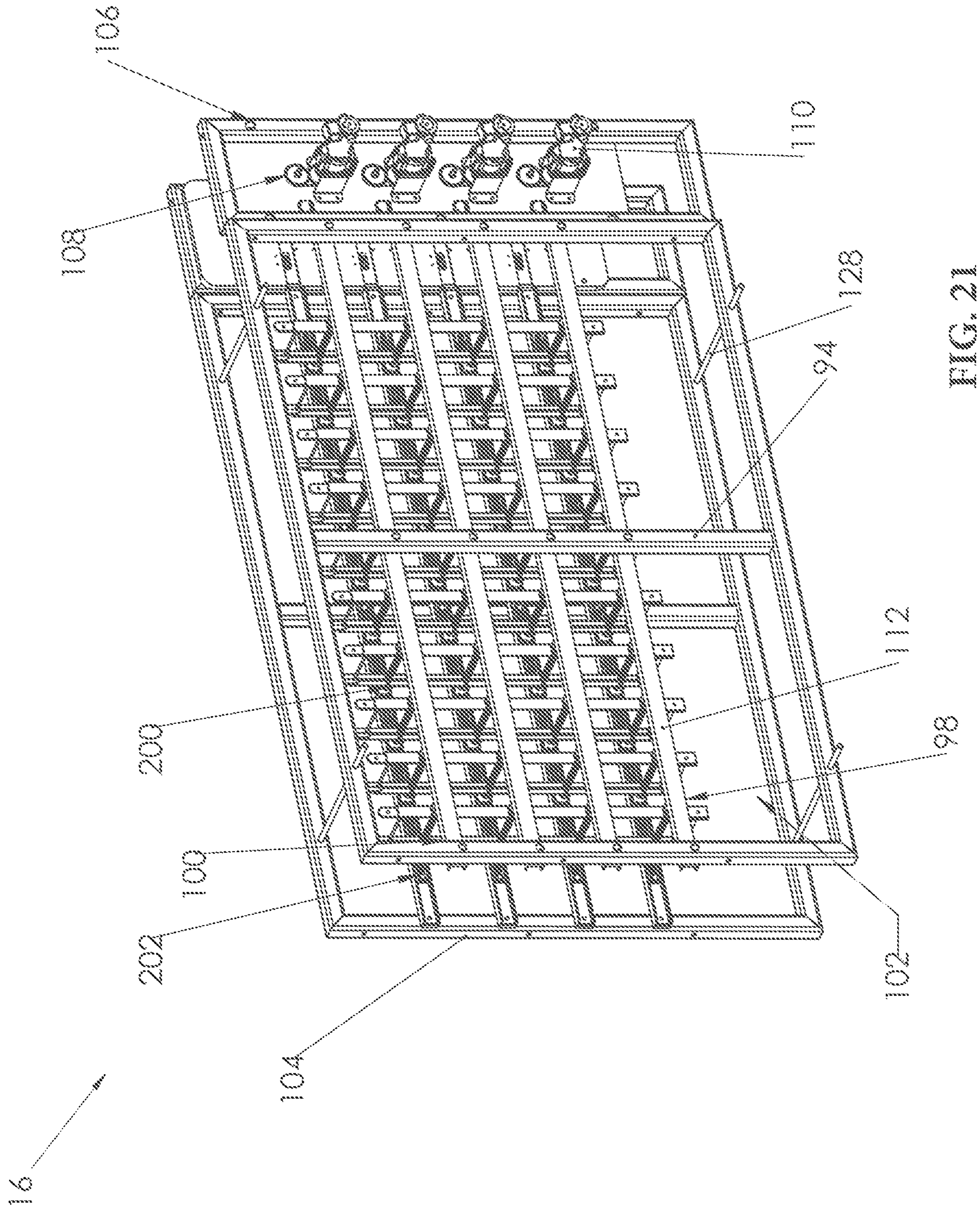
FIG. 21 is a perspective view of a staging area used in the system for constructing monolithic insulated concrete forms.
Figure 22:
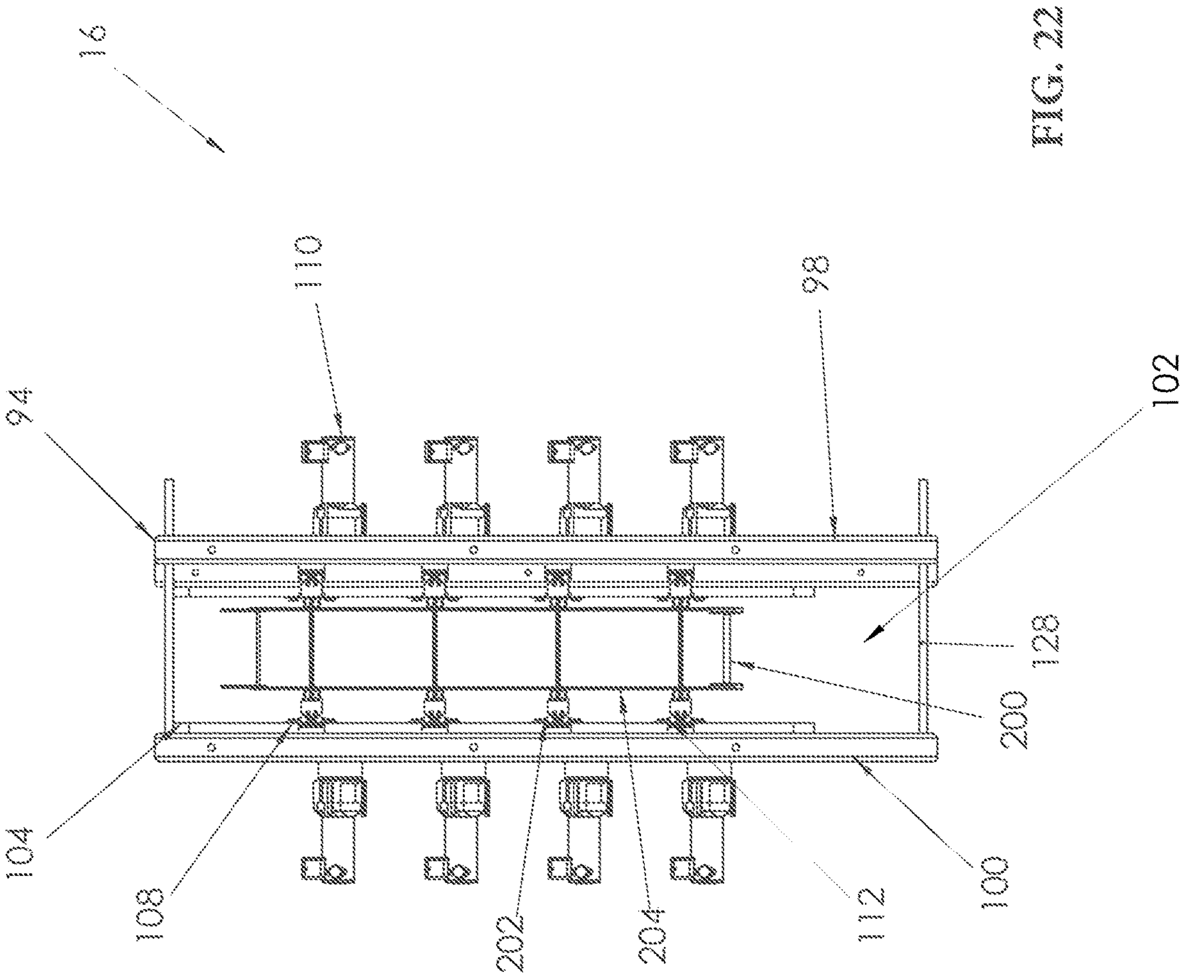
FIG. 22 is an end elevation view of the staging area shown in FIG. 21.
Figure 23:
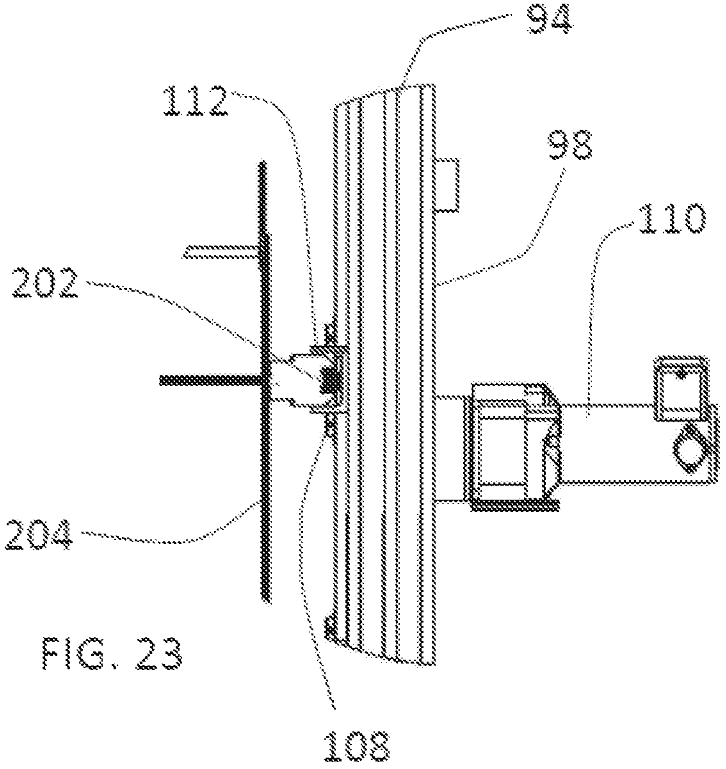
FIG. 23 is a detailed view of a portion of the staging area shown in FIG. 22.

Referring to FIG. 21 and FIG. 22, staging area 16 may have a support structure 94 that has an adjustable shaft 128, a first wall 98 and a second wall 100 which define a staging channel 102 and both walls may be disconnected and re-assembled to adjust for other sizes of insulated concrete form skeletons 200. The staging area 16 may be adjustable and may move along shafts 128 and the staging area is fastened to the assembly machine 12 and mold assembly 14. Support structure 94 may have an entrance end 104 and an exit end 106 through which insulated concrete form skeletons 200 travel. In the embodiment shown, staging channel 102 may have a series of guiding channels 112 that may be positioned such that they are continuous with the guiding channels 58 of press assembly 32. Referring to FIG. 23, straps 202 slide through guide channels 112. Referring to FIG. 1, staging area 16 may be connected to the exit 95 of the press assembly 32 to receive completed insulated concrete form skeletons 200 from the press assembly 32 and to the entrance 78 of the mold assembly 14. Movement through staging area 16 may occur through contact between insulated concrete form skeletons 200 or through the use of driving means. Insulated concrete form skeletons 200 may be driven forward through the use of rams, pistons, pulleys, rollers and any other driven device known in the art. A strong enough force will cause insulated concrete form skeletons 200 that are positioned in end to end relation within staging channel 102 and mold assembly 14 to be connected. This may be completed through manual force such as where the operator applies pressure until the ends connect. It is preferable, however, for this to be an automated force. Referring to FIG. 21, in the embodiment shown, this force may be created through the use of rollers 108 powered by electric motors 110 positioned at the exit end 106 of the support structure 94. The positioning of these rollers 108 at the exit end 106 of the support structure 94 allows for the connection of the insulated concrete form skeleton 200 in the mold assembly 14 to the insulated concrete form skeleton 200 in the staging area 16.

Referring to FIG. 1, assembly machine 12, mold assembly 14 and staging area 16 are preferably made of a metal such as steel or aluminum. A person of skill will understand that different materials may be used for different components of system 10.

Referring to FIG. 1, system 10 is preferably a completely automated system. A control panel, not shown, may be linked to system 10 to control each aspect of the system, from the movement of straps 202 from the strap loading assembly 18 through to removing and labelling the completed insulated concrete form 216 from the mold assembly 14 using ejection rollers 115. Referring to FIG. 2, feeding straps 202 into feeders 24 is preferably done through the use of automated means such as through the use of a robotic arm, not shown. It will be understood that straps 202 may be manually loaded into feeders 24. The same is true of strap receiving ladders 204 being loaded into loading channels 40. The loading of strap receiving ladders 204 into loading channels 40 may occur through automated means such as through the use of a robotic arm, not shown, or may be manually loaded into loading channels 40. Referring to FIG. 5, rams 34 may be controlled by control panel to push straps 202 along guide channels 30 towards press assembly 32, shown in FIG. 2.

Referring to FIG. 10 and FIG. 11, a series of rollers 60 may be used to control the movement of straps 202 into press cavity 56, shown in FIG. 10. Referring to FIG. 12, electric motors 62 may be controlled by the control panel and controls the rollers 60 and, in turn, the movement of straps 202. Referring to FIG. 2, moving assembly 45 may be controlled by the control panel to guide strap receiving ladders 204 into press assembly 32. A person of skill will understand that the order in which the straps 202 and the strap receiving ladders 204 enter the press cavity 56 of press assembly 32 is not important as long as the connections between them are properly aligned. Referring to FIG. 6, operation of rollers 41 may be controlled by the control panel to advance strap receiving ladders 204 as needed through loading channels 40. Referring to FIG. 12, pneumatic pistons 67 that control the positioning of ladder guides 66 may also be controlled by the control panel. Ladder guides 66 may be moved into position within the press cavity 56 either before or after strap receiving ladders 204 have been guided into press cavity 56.

Referring to FIG. 9, once the straps 202 and the strap receiving ladders 204 are properly positioned within press cavity 56, pneumatic pistons 65 may be controlled by the control panel to move second side 54 of press assembly 32 inwards so that the straps 202 and the strap receiving ladders 204 are connected together to form the insulated concrete form skeleton 200. Once the straps 202 and the strap receiving ladders 204 are connected together, pneumatic pistons 65 may move the second side 54 out of contact with the insulated concrete form skeleton 200 to allow the insulated concrete form skeleton 200 to be moved out of press cavity 56 through exit 95. Referring to FIG. 10 and FIG. 11, rollers 60 positioned adjacent the exit 95 of press assembly 32 may be used to propel insulated concrete form skeleton 200 out of exit 95. Movement of rollers 60 may be controlled by the control panel. Referring to FIG. 1, insulated concrete form skeleton 200 exits through exit 95 of assembly machine 12 and into staging area 16. Referring to FIG. 22, straps 202 of insulated concrete form skeletons 200 slide along guiding channels 112 within staging channel 102 of staging area 16. Referring to FIG. 21, electric motors 110 that control rollers 108 may be controlled by the control panel and may be used to provide the necessary force to connect the insulated concrete form skeleton 200 in the staging area 16 with the insulated concrete form skeleton 200 positioned within molding assembly 14, shown in FIG. 14. Referring to FIG. 1, rollers 108 may also be used to propel insulated concrete form skeleton 200 into mold assembly 14 and push the completed insulated concrete form 216 out of exit 80 working in conjunction with the ejection rollers 115.

Referring to FIG. 19, the control panel may control the movement of the lids 82 between the open position in which an insulated concrete form skeleton 200 can be positioned within interior cavity 76 and a closed position, shown in FIG. 18, in which access to the interior cavity 76 may be limited. Molding of insulated concrete form 216, shown in FIG. 26, occurs when the lids 82 are in the closed position. The injection of foam beads or other suitable material through fill guns 88 and the injection of steam through steam inlet/drain 90 and steam inlet 123 may also be controlled by the control panel.

Figure 30:
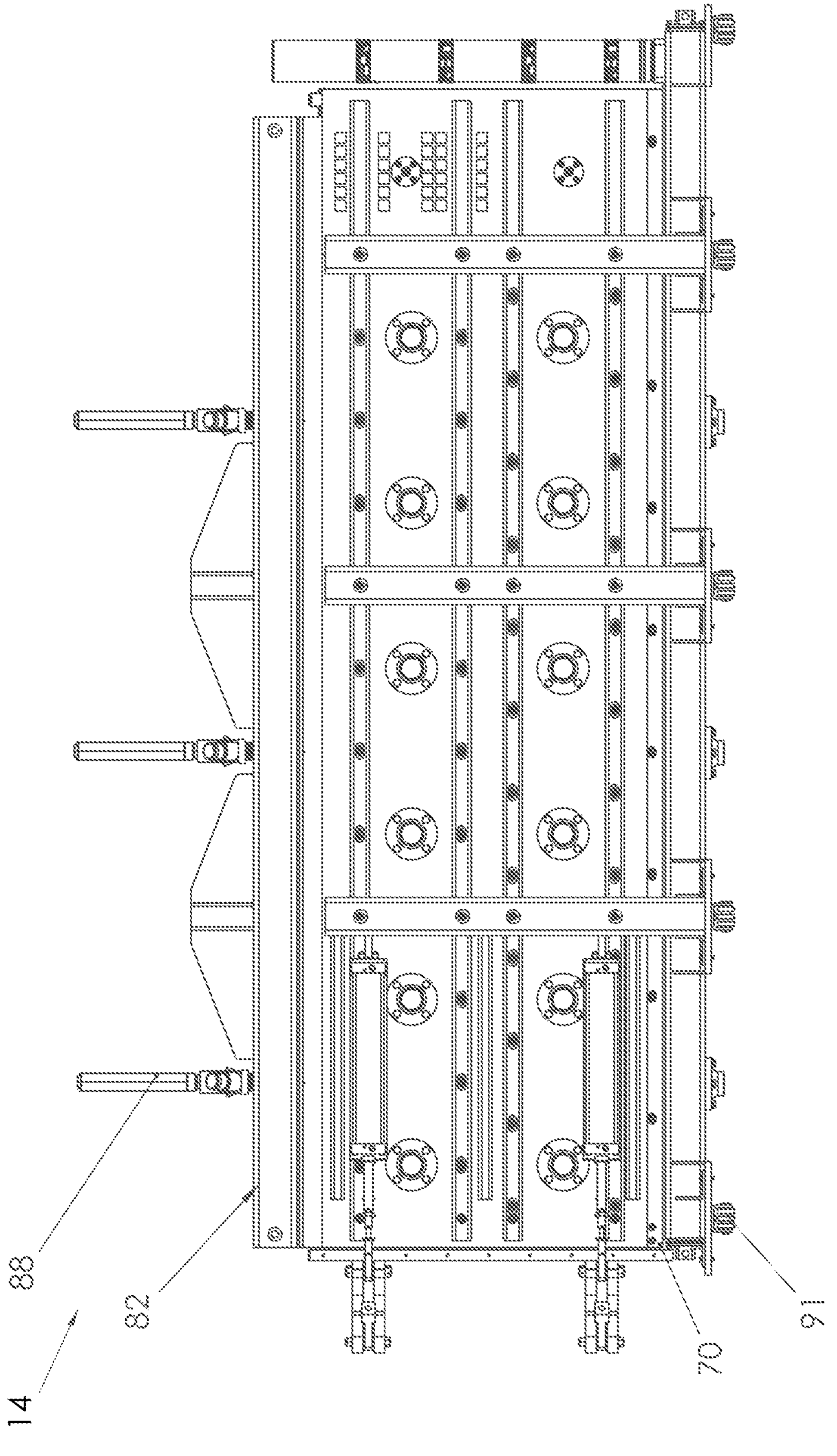
FIG. 30 is a depiction of the method used for expansion and contraction during heating cycles The same reference numerals refer to the same parts throughout the various figures.

FIG. 30 the bottom support base 70 may have two fixed mounting holes and slots along the side and along the steam inlet 123. This may allow for expansion and contraction to occur without moving the fixed ends and damaging the bolts.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the present technology. As such, the scope of the following claims should not be limited by the preferred embodiments set forth in the examples and drawings described above, but should be given the broadest interpretation consistent with the description as a whole.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The invention claimed is:

1. A mold assembly for molding insulated concrete forms, comprising:
- an outer housing having a bottom support base, a first side wall and a second side wall defining an interior cavity, the outer housing having an entrance and an exit for access to the interior cavity;
- first and second mold lids;
- first and second entrance doors;
- first and second pluralities of downward oriented extensions, each of the first and second pluralities of downward oriented extensions being movable between a retracted position and an inserted position, with the first and second pluralities of downward oriented extensions separated from one another to define spaces therebetween, in which, when the first and second pluralities of downward oriented extensions are in the inserted position, with the first and second pluralities of downward oriented extensions inserted into a series of spaces defined by and along opposed sides of an insulated concrete form skeleton that is located within the interior cavity in use, with the insulated concrete form skeleton located within the spaces therebetween the first and second pluralities of downward oriented extensions, first and second mold cavities are defined by:
  - the first and second mold lids,
  - the first and second entrance doors,
  - inside walls, with the first and second pluralities of downward oriented extensions, and the insulated concrete form skeleton, contacting one another in use to define the inside walls, and
  - outside walls defined by the first side wall and the second side wall, with the first and second pluralities of downward oriented extensions spaced from the outside walls to define voids; and
- fill guns oriented for injecting insulating polymeric material into the first and second mold cavities.

2. The mold assembly of claim 1 wherein the fill guns comprise pluralities of fill guns spaced on the first and second mold lids.

3. The mold assembly of claim 1 wherein the first and second pluralities of downward oriented extensions have removable spacer plates to reduce buckling as well as adjust the interior size of the first and second mold cavities.

4. The mold assembly of claim 1 in which the first and second pluralities of downward oriented extensions are mounted on the first and second mold lids, respectively.

5. The mold assembly of claim 1 in which the first and second pluralities of downward oriented extensions are structured to translate vertically between the retracted and inserted positions.

6. The mold assembly of claim 1 further comprising ejection rollers at the exit.

7. The mold assembly of claim 1 in which the fill guns comprise foam guns for filling foam beads in the first and second mold cavities; and further comprising:
- a steam inlet for injecting steam into the first and second mold cavities; and
- an air inlet for cooling down the molded insulated concrete form using sensor-aided thermoelectric coolers and aluminum fins.

8. The mold assembly of claim 1 further comprising an adjustable spacer between the first and second pluralities of downward oriented extensions for adjusting the first and second mold cavities in size.

9. A system for constructing monolithic insulated concrete forms, comprising:

an assembly machine having:
- a strap loading assembly having a first side and a second side, the first side and the second side being positioned in opposite and parallel spaced relation to each other, each of the first side and the second side having a support structure and a feeder having a loading end and a press assembly feeding end, the press assembly feeding end of the strap loading assembly being structured to position in use a strap in a strap guide, the strap being movable along the strap guide into a press assembly;

a ladder loading assembly having a support structure and a ladder guide, the ladder guide having a loading end and a press assembly feeding end, the ladder guide being structured to move and position in use a strap receiving ladder into the press assembly; and the press assembly having a support structure, a first side and a second adjustable side with a space between the first side and the second adjustable side of the press assembly defining a press cavity, each of the first side and the second adjustable side of the press assembly having a press assembly strap guide, the press assembly strap guides being continuous with the strap guides of the strap loading assembly to move in use the straps through the press assembly strap guides, the press assembly structured to align in use the straps and the strap receiving ladder for connection, the second adjustable side being movable to press in use the straps and strap receiving ladder into connection with each other to form an insulated concrete form skeleton, and an exit through which the completed insulated concrete form skeleton is removable; and a mold assembly having:

an outer housing having a bottom support base, a first side wall and a second side wall defining an interior cavity, the outer housing having an entrance and an exit for access to the interior cavity;

first and second mold lids;

first and second entrance doors;

first and second pluralities of downward oriented extensions, each of the first and second pluralities of downward oriented extensions being movable between a retracted position and an inserted position, in which, when the first and second pluralities of downward oriented extensions are in the inserted position, with the first and second pluralities of downward oriented extensions inserted into a series of spaces defined by and along opposed sides of an insulated concrete form skeleton that is located within the interior cavity in use, first and second mold cavities are defined by the first and second mold lids, the first and second entrance doors, the first and second pluralities of downward oriented extensions, and the insulated concrete form skeleton; and fill guns oriented for injecting insulating polymeric material into the first and second mold cavities.

10. The system of claims 9 further comprising a staging area having a support structure, the support structure having a base, a first wall and a second wall defining an adjustable staging guide, the support structure having an entrance end and an exit end for access to the staging guide, the entrance end of the staging area being positioned adjacent to the press assembly for accepting the insulated concrete form skeleton from the press assembly, the exit end being positioned adjacent to the entrance of the mold assembly for guiding the insulated concrete form skeleton into the mold assembly.

11. The system of claim 10 wherein the staging area further comprises a form drive for moving the insulated concrete form skeleton through the staging area.

12. The system of claims 11 wherein the form drive comprises rollers positioned adjacent the exit end of the staging area, the rollers being driven by motors.

13. The mold assembly of claim 1 further comprising a blocking part used to seal the exit of the mold assembly during molding of a first insulated concrete form.

14. The mold assembly of claim 13 in which the blocking part comprises a rubber block plug.

15. The mold assembly of claim 1 in which the insulated concrete form skeleton, is within the interior cavity, and also extends out of the interior cavity past the exit of the outer housing where the insulated concrete form skeleton forms part of a first insulated concrete form portion, which blocks the exit.

16. The mold assembly of claim 1 in which:

the insulated concrete form skeleton comprises a plurality of parallel ladders and straps connecting the parallel ladders; and when in the inserted position in use, the first and second pluralities of downward oriented extensions are inserted into a series of vertical spaces defined by the ladders to contact the ladders in use to define the inside walls, with the straps located within the first and second mold cavities.

17. The system of claim 9 further comprising a blocking part used to seal the exit of the mold assembly during molding of a first insulated concrete form.

18. The system of claim 17 in which:

the insulated concrete form skeleton comprises a plurality of parallel ladders and straps connecting the parallel ladders; and when in the inserted position in use, the first and second pluralities of downward oriented extensions are inserted into a series of vertical spaces defined by the ladders to contact the ladders in use to define the inside walls, with the straps located within the first and second mold cavities.

* * * * *